(12) United States Patent
Yang et al.

(10) Patent No.: US 12,500,838 B2
(45) Date of Patent: Dec. 16, 2025

(54) PSEUDO WIRE PACKET TRANSMISSION METHOD AND RELATED DEVICE

(71) Applicant: HUAWEI TECHNOLOGIES CO., LTD., Shenzhen (CN)

(72) Inventors: Fan Yang, Shenzhen (CN); Tianran Zhou, Beijing (CN); Yun Chen, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 18/393,064

(22) Filed: Dec. 21, 2023

(65) Prior Publication Data

US 2024/0171510 A1 May 23, 2024

Related U.S. Application Data

(63) Continuation of application No. PCT/CN2022/097256, filed on Jun. 7, 2022.

(30) Foreign Application Priority Data

Jun. 23, 2021 (CN) .......................... 202110700473.2

(51) Int. Cl.
*H04L 45/00* (2022.01)
*H04L 45/302* (2022.01)
(Continued)

(52) U.S. Cl.
CPC ........ *H04L 45/566* (2013.01); *H04L 45/3065* (2013.01); *H04L 45/74* (2013.01)

(58) Field of Classification Search
CPC ... H04L 45/566; H04L 45/3065; H04L 45/74; H04L 45/50; H04L 45/68; H04L 45/741; H04L 45/745; H04L 45/34; H04L 49/118
See application file for complete search history.

(56) References Cited

U.S. PATENT DOCUMENTS 8,160,055 B1 * 4/2012 Nadeau ................... H04L 43/10
370/231
9,860,169 B1 * 1/2018 Ninan .................... H04L 45/033
(Continued)

FOREIGN PATENT DOCUMENTS

CN 108886494 A 11/2018
CN 110830352 A * 2/2020 ......... H04L 12/4633
(Continued)

OTHER PUBLICATIONS

Cisco: "Troubleshooting a Pseudowire," Updated: Sep. 6, 2017, Document ID: 212007 (Year: 2017).*
(Continued)

*Primary Examiner* — Alina A Boutah
(74) *Attorney, Agent, or Firm* — Leydig, Voit & Mayer, Ltd.

(57) ABSTRACT

A packet transmission method and device are disclosed. A first pseudo wire (PW) is established between a first node and a second node. The first node obtains a first service packet, and performs SRv6 encapsulation on the first service packet to obtain a second service packet. The second service packet includes the first service packet and information about the first PW. The first node sends the second service packet to the second node through the first PW. After receiving the second service packet, the second node performs SRv6 decapsulation on the second service packet to obtain the first service packet. An ingress PE device can perform SRv6 encapsulation on a PW service, and encapsulate PW description information and a to-be-transmitted service packet into an actually sent service packet, and an egress PE device performs SRv6 decapsulation on the service packet received through the PW to obtain the to-be-transmitted service packet.

26 Claims, 14 Drawing Sheets

| | Version (Version) | Traffic class (Traffic Class) | Flow label (Flow Label) | | |
|---|---|---|---|---|---|
| IPv6 header: | Payload length (Payload Length) | | | Next header (Next Header) | Hop limit (Hop Limit) |
| | Source address (Source Address) | | | | |
| | Destination address (Destination Address) | | | | |
| UDP header: | Source port number (Source Port Number) | | | Destination port number (Destination Port Number) | |
| | UDP length (Length) | | | UDP checksum (Checksum) | |
| RTP header: | RTV | P | X | CC | M | PT | RTP sequence number (Sequence Number) |
| | Timestamp (Timestamp) | | | | |
| | Synchronization source identifier (SSRC identifier) | | | | |
| TDMoIP control word: | RES | L | R | M | RES | Length | Sequence number (Sequence Number) |
| | Payload (payload) | | | | |

(51) Int. Cl.
*H04L 45/50* (2022.01)
*H04L 45/74* (2022.01)
*H04L 45/741* (2022.01)

(56) References Cited

U.S. PATENT DOCUMENTS

| | | | | |
|---|---|---|---|---|
| 10,044,607 | B2 * | 8/2018 | Chapman | H04L 45/50 |
| 10,454,819 | B2 * | 10/2019 | Chunduri | H04L 45/68 |
| 10,541,923 | B2 * | 1/2020 | Skalecki | H04L 45/70 |
| 11,245,620 | B2 * | 2/2022 | Geng | H04L 45/34 |
| 2005/0190757 | A1 * | 9/2005 | Sajassi | H04L 12/2856 |
| | | | | 370/466 |
| 2008/0144632 | A1 * | 6/2008 | Rabie | H04L 47/43 |
| | | | | 370/395.5 |
| 2009/0190610 | A1 * | 7/2009 | Pirbhai | H04L 12/2852 |
| | | | | 370/466 |
| 2011/0051597 | A1 * | 3/2011 | Cohen | H04L 43/0811 |
| | | | | 370/242 |
| 2012/0219016 | A1 * | 8/2012 | Xie | H04L 12/4654 |
| | | | | 370/474 |
| 2012/0224583 | A1 * | 9/2012 | Sergeev | H04L 45/68 |
| | | | | 370/395.5 |
| 2016/0366052 | A1 * | 12/2016 | Chapman | H04L 45/66 |
| 2019/0245787 | A1 | 8/2019 | Skalecki et al. | |
| 2020/0358698 | A1 * | 11/2020 | Song | H04L 45/50 |
| 2022/0124019 | A1 * | 4/2022 | Boutros | H04L 45/34 |
| 2022/0345438 | A1 * | 10/2022 | Mishra | H04L 69/325 |

FOREIGN PATENT DOCUMENTS

| | | | | | |
|---|---|---|---|---|---|
| CN | 112368980 | A | * | 2/2021 | H04L 45/16 |
| CN | 108886494 | B | * | 3/2021 | H04L 12/4633 |
| CN | 114760165 | A | * | 7/2022 | H04L 12/4641 |
| EP | 4319096 | A1 | * | 2/2024 | H04L 45/3065 |
| WO | WO-2017141081 | A1 | * | 8/2017 | H04L 45/02 |
| WO | WO-2019239173 | A1 | * | 12/2019 | H04L 45/122 |
| WO | WO-2020029976 | A1 | * | 2/2020 | H04L 12/4633 |
| WO | WO-2021226451 | A1 | * | 11/2021 | G06F 13/4022 |
| WO | WO-2022000264 | A1 | * | 1/2022 | H04L 12/4633 |

OTHER PUBLICATIONS

Gringeri et al., "Private Line Emulation over Packet Switched Networks draft-schmutzer-bess-ple-00," total 15 pages (Jul. 12, 2020).

Schulzrinne et al., "RTP: A Transport Protocol for Real-Time Applications," Request for Comments: 3550, total 104 pages (Jul. 2003).

Martini et al., "Encapsulation Methods for Transport of Ethernet over MPLS Networks," Request for Comments: 4448, total 24 pages (Apr. 2006).

Vainshtein et al., "Structure-Agnostic Time Division Multiplexing (TDM) over Packet (SAToP)," Request for Comments: 4553, total 27 pages (Jun. 2006).

Malis et al., "Synchronous Optical Network/Synchronous Digital Hierarchy (SONET/SDH) Circuit Emulation over Packet (CEP)," Request for Comments: 4842, total 43 pages (Apr. 2007).

Vainshtein et al., "Structure-Aware Time Division Multiplexed (TDM) Circuit Emulation Service over Packet Switched Network (CESoPSN)," Request for Comments: 5086, total 38 pages (Dec. 2007).

Stein et al., "Time Division Multiplexing over IP (TDMoIP)," Request for Comments: 5087, total 50 pages (Dec. 2007).

Filsfils et al., "RFC 8754 IPv6 Segment Routing Header (SRH)," total 23 pages (Mar. 2020).

* cited by examiner

| | Version (Version) | Traffic class (Traffic Class) | Flow label (Flow Label) | |
|---|---|---|---|---|
| IPv6 header: | Payload length (Payload Length) | | Next header (Next Header) | Hop limit (Hop Limit) |
| | Source address (Source Address) | | | |
| | Destination address (Destination Address) | | | |
| UDP header: | Source port number (Source Port Number) | | Destination port number (Destination Port Number) | |
| | UDP length (Length) | | UDP checksum (Checksum) | |
| RTP header: | RTV / P / X / CC / M / PT | | RTP sequence number (Sequence Number) | |
| | Timestamp (Timestamp) | | | |
| | Synchronization source identifier (SSRC identifier) | | | |
| TDMoIP control word: | RES / L / R / M / RES / Length | | Sequence number (Sequence Number) | |
| | Payload (payload) | | | |

FIG. 1

| | Version (Version) | Traffic class (Traffic Class) | Flow label (Flow Label) | |
|---|---|---|---|---|
| IPv6 header: | Payload length (Payload Length) | | Next header (Next Header) | Hop limit (Hop Limit) |
| | Source address (Source Address) | | | |
| | Destination address (Destination Address) | | | |
| L2TPv3 header: | Session identifier (Session ID) | | | |
| | Optional random Cookie 1 | | | |
| | Optional random Cookie 2 | | | |
| RTP header: | RTV \| P \| X \| CC \| M \| PT | | | RTP sequence number (Sequence Number) |
| | Timestamp (Timestamp) | | | |
| | Synchronization source identifier (SSRC identifier) | | | |
| TDMoIP control word: | RES \| L \| R \| M \| RES \| Length | | | Sequence number (Sequence Number) |
| | Payload (payload) | | | |

FIG. 2

Service packet 2 (including information 0):

Service packet 4' (including information 1):

IPv6 header:

| Version (Version) | Traffic class (Traffic Class) | Flow label (Flow Label) | | |
|---|---|---|---|---|
| Payload length (Payload Length) | | | Next header (Next Header) | Hop limit (Hop Limit) |
| Source address (Source Address) | | | | |
| Destination address (Destination Address) | | | | |

SRH:

| Next header (Next Header) | Extension header SRH length (Hdr Ext Len) | Routing type (Routing Type) | Segments left (Segments Left) |
|---|---|---|---|
| Index of the last SID (Last Entry) | Flags (Flags) | | Tag (Tag) |
| Segment list 0 | | | |

IPv6 DOH: (including an extended TLV)

| Next header (Next Header) | Extension header DOH length (Hdr Ext Len) | Type (indicating that the TLV carries metadata 0) | Reserved |
|---|---|---|---|
| PW ID (=PW 100) | | | |
| L | R | N | P | FRG | Length | Rvd | Sequence Number |

RTP header:

| RTV | P | X | CC | M | PT | RTP sequence number (Sequence Number) |
|---|---|---|---|---|---|---|
| Timestamp (Timestamp) | | | | | | |
| Synchronization source identifier (SSRC identifier) | | | | | | |
| Payload (payload) | | | | | | |

FIG. 6a

IPv6 header:

| Version (Version) | Traffic class (Traffic Class) | Flow label (Flow Label) | |
|---|---|---|---|
| Payload length (Payload Length) | | Next header (Next Header) | Hop limit (Hop Limit) |
| Source address (Source Address) ||||
| Destination address (Destination Address) ||||

SRH:

| Next header (Next Header) | Extension header SRH length (Hdr Ext Len) | Routing type (Routing Type) | Segments left (Segments Left) |
|---|---|---|---|
| Index of the last SID (Last Entry) | Flags (Flags) | | Tag (Tag) |
| Segment list 0 ||||

Extended SRH TLV:

| SRH Type (indicating that the TLV carries metadata 0) | SRH Length | Reserved |
|---|---|---|
| PW ID (=PW 100) |||

RTP header:

| L | R | N | P | FRG | Length | Rvd |
|---|---|---|---|---|---|---|
| RTV | P | X | CC | M | PT | Sequence Number |
| Timestamp (Timestamp) |||||||
| Synchronization source identifier (SSRC identifier) |||||||
| RTP sequence number (Sequence Number) |||||||
| Payload (payload) |||||||

FIG. 6b

| Data frame 1 (Frame 1#) | Timeslot TS 1 | TS 2 | TS 3 | TS 4 |
|---|---|---|---|---|
| | ... | | | TS N |
| Data frame 2 (Frame 2#) | Timeslot TS 1 | TS 2 | TS 3 | TS 4 |
| | ... | | | TS N |
| | ... | | | |
| Data frame N (Frame N#) | Timeslot TS 1 | TS 2 | TS 3 | TS 4 |
| | ... | | | TS N |

FIG. 7a

| SONET data or SDH data |
|---|

FIG. 7b

PSEUDO WIRE PACKET TRANSMISSION METHOD AND RELATED DEVICE

CROSS-REFERENCE TO RELATED APPLICATIONS

This application is a continuation of International Application No. PCT/CN2022/097256, filed on Jun. 7, 2022, which claims priority to Chinese Patent Application No. 202110700473.2, filed on Jun. 23, 2021. The disclosures of the aforementioned applications are hereby incorporated by reference in their entireties.

TECHNICAL FIELD

This application relates to the field of communication technologies, and in particular, a packet transmission method and a related device.

BACKGROUND

A pseudo wire (PW) is a point-to-point connection established between provider edge (PE) devices. In an IP packet network, a PW is loaded by using a tunnel. Service packets of various emulation services (such as a frame relay service, a time division multiplexing (TDM) service, and an asynchronous transfer mode (ATM) service) are encapsulated into packet data packets on an ingress PE device of the PW, transparently transmitted through the PW (that is, an intermediate device on the PW does not change the transmitted packet data packets), and then transmitted to an egress PE device of the PW. The egress PE device restores the packet data packets to the original service packets, to implement emulation of various services.

With development of a segment routing over internet protocol version 6 (SRv6) network, pseudo wire emulation applicable to the SRv6 network needs to be implemented, to conveniently and quickly complete packet transmission of various services.

SUMMARY

Based on this, embodiments of this application provide a packet transmission method and a related device, to implement fast and convenient PW emulation for various services, and provide a PW emulation service applicable to an SRv6 network.

According to a first aspect, this application provides a packet transmission method, executed by a first node, where a first pseudo wire PW is established between the first node and a second node. For example, the method may include: The first node obtains a first service packet, and performs SRv6 encapsulation on the first service packet to obtain a second service packet, where the second service packet includes the first service packet and information about the first PW. In this way, the first node can send the second service packet to the second node through the first PW. It can be learned that, in the method, a processing mechanism corresponding to the PW is defined on PE devices at both ends of the PW. In tis way, an ingress PE device can perform SRv6 encapsulation on a PW service, and encapsulate PW description information and a to-be-transmitted service packet into an actually sent service packet, so that an egress PE device performs SRv6 decapsulation on the service packet received through the PW to obtain the to-be-transmitted service packet. In this process, only the IP is used, and service packet transmission in an SRv6 network can be implemented without multi-protocol nesting, so that PW emulation services of various services are conveniently and quickly completed.

In an example, that the first node performs SRv6 encapsulation on the first service packet, for example, may include: The first node encapsulates a segment routing header SRH outside the first service packet, where the SRH includes a segment list Segment list corresponding to the first PW. In this way, because the Segment list in the second service packet corresponds to the first PW, it can be ensured that the first node forwards the second service packet to the second node through the first PW.

In an implementation, the method may further include: The first node determines that the first service packet matches an SR policy. During exemplary implementation, the first node may store a correspondence between an interface and a PW. When receiving the first service packet, the first node may determine, based on an interface through which the first node receives the first service packet, that the first service packet needs to be transmitted through the first PW. In addition, the first node may further use an address of the determined egress PE device (namely, the second node) of the first PW as a destination address of the first service packet, search a local routing and forwarding table based on the destination address and a color, and determine a next hop, namely, an SR policy corresponding to the first PW, as the SR policy that matches the first service packet.

In an example, the determined SR policy that matches the first service packet may correspond to a first instruction action. In this case, that the first node performs SRv6 encapsulation on the first service packet to obtain a second service packet may include: The first node performs SRv6 encapsulation on the first service packet based on the first instruction action, to obtain the second service packet. In this way, the first instruction action corresponding to the SR policy of the first PW is configured on the ingress PE device (namely, the first node) of the first PW, so that the first node can quickly and conveniently process the first service packet, and PW emulation efficiency and packet transmission efficiency are improved.

In another example, the determined SR policy that matches the first service packet may not correspond to an instruction action designed in this embodiment of this application. In this case, before the first node performs SRv6 encapsulation on the first service packet to obtain the second service packet, the method may further include: The first node processes the first service packet according to a common SR policy, or in other words, the first node processes the first service packet based on the SR policy to obtain a third service packet, and the first node determines that a destination address of the third service packet is a first SID of the first node, where the first SID corresponds to a second instruction action. In this case, that the first node performs SRv6 encapsulation on the first service packet to obtain a second service packet may include: The first node processes the third service packet based on the second instruction action, to obtain the second service packet. In this way, the second instruction action corresponding to the first SID of the first PW is configured on the first node of the first PW, so that the first node can process the first service packet.

In another implementation, the first node may alternatively be an intermediate PE device between a second PW and the first PW. In other words, the second PW is established between a third node and the first node. In this case, the method may further include: The first node receives a fourth service packet from the third node through the second PW; and the first node determines that a destination address of the fourth service packet is a second SID of the first node, where the second SID corresponds to a third instruction action. In this case, that the first node obtains a first service packet may include: The first node performs SRv6 decapsulation on the fourth service packet based on the third instruction action, to obtain the first service packet. In this implementation, the second SID may correspond to the fourth instruction action. In this case, that the first node performs SRv6 encapsulation on the first service packet to obtain a second service packet may include: The first node performs SRv6 encapsulation on the first service packet based on the fourth instruction action, to obtain the second service packet. In this way, in a multi-segment PW scenario, two instruction actions (namely, the third instruction action and the fourth instruction action) corresponding to the second SID are configured on the intermediate PE device between the two PW segments, and respectively process operations that need to be performed by the intermediate PE device as an egress PE device of a previous PW segment and as an ingress PE device of a next PW segment correspondingly, so that the first node can implement fast emulation of the PW and implement packet processing.

In a possible implementation, a third PW may further be established between the first node and the second node, and the method may further include: The first node obtains a fifth service packet, and performs SRv6 encapsulation on the fifth service packet to obtain a sixth service packet, where the sixth service packet includes the fifth service packet and information about the third PW. In this way, the first node sends the sixth service packet to the second node through the third PW. In this way, service packet transmission in the SRv6 network can be implemented without multi-protocol nesting, and PW emulation services of various services are conveniently and quickly completed.

According to a second aspect, this application further provides a packet transmission method, executed by a second node, where a first pseudo wire PW is established between a first node and the second node. For example, the method may include: The second node receives a second service packet from the first node through the first PW, where the second service packet includes a first service packet and information about the first PW; and the second node performs segment routing over internet protocol version 6 SRv6 decapsulation on the second service packet to obtain the first service packet. It can be learned that, in the method, a processing mechanism corresponding to the PW is defined on PE devices at both ends of the PW. In tis way, an ingress PE device can perform SRv6 encapsulation on a PW service, and encapsulate PW description information and a to-be-transmitted service packet into an actually sent service packet, so that an egress PE device performs SRv6 decapsulation on the service packet received through the PW to obtain the to-be-transmitted service packet. In this process, only the IP is used, and service packet transmission in an SRv6 network can be implemented without multi-protocol nesting, so that PW emulation services of various services are conveniently and quickly completed.

In an example, that the second node performs SRv6 decapsulation on the second service packet may include: The second node removes a segment routing header SRH of the second service packet, where the SRH includes a segment list Segment list corresponding to the first PW. In this way, the second node can obtain the first service packet.

In an implementation, the SRH of the second service packet includes a SID of the second node, the SID of the second node corresponds to a first instruction action, and that the second node performs SRv6 decapsulation on the second service packet to obtain the first service packet may include: The second node performs SRv6 decapsulation on the second service packet based on the first instruction action, to obtain the first service packet. In this way, a correspondence between the SID of the second node and the first instruction action may be configured on the egress PE device (namely, the second node) of the first PW, to implement processing on the service packet transmitted from the first PW.

In an implementation, the method may further include: The second node restores a service corresponding to the first service packet based on the information about the first PW, to obtain a third service packet.

In an example, if another PW is not connected after the second node, the method may further include: The second node sends the third service packet to a destination host.

In another example, if a second PW is established between the second node and a third node, the method may further include: The second node performs SRv6 encapsulation on the third service packet to obtain a fourth service packet, where the fourth service packet includes the third service packet and information about the second PW; and the second node sends the fourth service packet to the third node through the second PW. In this example, the SRH of the second service packet includes the SID of the second node, the SID of the second node further corresponds to a second instruction action, and that the second node performs SRv6 encapsulation on the third service packet to obtain a fourth service packet may include: The second node performs SRv6 encapsulation on the third service packet based on the second instruction action, to obtain the fourth service packet. In this way, in a multi-segment PW scenario, an intermediate PE device between PWs at both ends may continue to process, based on a requirement of a next PW segment, a service packet obtained through decapsulation, to complete effective transmission of the service packet on the next PW segment, so that packet transmission in the multi-segment PW scenario in the SRv6 network is implemented.

It should be noted that, to ensure reliability of PW emulation, before the egress PE device of the PW decapsulates the received service packet, the egress PE device may further verify the PW, for example, obtain a PW ID from the received service packet, and search a control plane to learn whether a PW corresponding to the PW ID is configured. If the PW is configured, the verification succeeds, and SRv6 decapsulation is performed on the received service packet; otherwise, if the PW is not found, the verification fails, and the service packet is discarded.

It should be noted that, in the methods provided in the first aspect and the second aspect, an IPv6 DOH of the second service packet may carry the information about the first PW. Alternatively, the SRH of the second service packet may also carry the information about the first PW.

The information about the first PW may include an identifier of the first PW, a plurality of flags Flags, and a sequence number Sequence Number. The plurality of flags Flags and the sequence number Sequence Number may alternatively be referred to as a control word of the first PW.

It should be noted that, the first service packet may be a packet corresponding to a non-Ethernet service. The non-Ethernet service includes any one of the following services: a frame relay service, a time division multiplexing TDM service, or an asynchronous transfer mode ATM service. The TDM may include but is not limited to: an E1 service, an E3 service, a T1 service, a T3 service, a SONET service, or an SDH service.

According to a third aspect, this application further provides a packet transmission apparatus, where the apparatus is applied to a first node, a first pseudo wire PW is established between the first node and a second node, and the apparatus may include: a first obtaining unit, a first processing unit, and a first sending unit. The first obtaining unit is configured to obtain a first service packet; the first processing unit is configured to perform segment routing over internet protocol version 6 SRv6 encapsulation on the first service packet to obtain a second service packet, where the second service packet includes the first service packet and information about the first PW; and the first sending unit is configured to send the second service packet to the second node through the first PW.

In an implementation, the first processing unit is configured to encapsulate a segment routing header SRH outside the first service packet, where the SRH includes a segment list Segment list corresponding to the first PW.

In an implementation, the apparatus further includes a first determining unit. The first determining unit is configured to determine that the first service packet matches a segment routing policy SR policy.

In an example, the SR policy corresponds to a first instruction action, and the first processing unit is configured to: perform SRv6 encapsulation on the first service packet based on the first instruction action, to obtain the second service packet.

In another example, the apparatus further includes a second processing unit and a second determining unit. The second processing unit is configured to: process the first service packet based on the SR policy, to obtain a third service packet; and the second determining unit is configured to determine that a destination address of the third service packet is a first SID of the first node, where the first SID corresponds to a second instruction action. In this case, the first processing unit is configured to: process the third service packet based on the second instruction action, to obtain the second service packet.

In another implementation, a second PW is established between a third node and the first node, and the apparatus further includes a receiving unit and a third determining unit. The receiving unit is configured to receive a fourth service packet from the third node through the second PW; and the third determining unit is configured to determine that a destination address of the fourth service packet is a second SID of the first node, where the second SID corresponds to a third instruction action. In this case, the first obtaining unit is configured to: perform SRv6 decapsulation on the fourth service packet based on the third instruction action, to obtain the first service packet. In this implementation, the second SID corresponds to a fourth instruction action, and the first processing unit is configured to: perform SRv6 encapsulation on the first service packet based on the fourth instruction action, to obtain the second service packet.

In still another implementation, a third PW is established between the first node and the second node, and the apparatus further includes: a second obtaining unit, a third processing unit, and a second sending unit. The second obtaining unit is configured to obtain a fifth service packet; the third processing unit is configured to perform SRv6 encapsulation on the fifth service packet to obtain a sixth service packet, where the sixth service packet includes the fifth service packet and information about the third PW; and the second sending unit is configured to send the sixth service packet to the second node through the third PW.

According to a fourth aspect, this application further provides a packet transmission apparatus applied to a second node, a first pseudo wire PW is established between a first node and the second node, and the apparatus includes a first receiving unit and a first processing unit. The first receiving unit is configured to receive a second service packet from the first node through the first PW, where the second service packet includes a first service packet and information about the first PW; and the first processing unit is configured to perform segment routing over internet protocol version 6 SRv6 decapsulation on the second service packet to obtain the first service packet.

In an implementation, the first processing unit is configured to remove a segment routing header SRH of the second service packet, where the SRH includes a segment list Segment list corresponding to the first PW.

In another implementation, the SRH of the second service packet includes a SID of the second node, the SID of the second node corresponds to a first instruction action, and the first processing unit is configured to: perform SRv6 decapsulation on the second service packet based on the first instruction action, to obtain the first service packet and the information about the first PW.

In an implementation, the apparatus further includes a restoring unit. The restoring unit is configured to: restore a service corresponding to the first service packet based on the information about the first PW, to obtain a third service packet.

In an example, the apparatus further includes a first sending unit. The first sending unit is configured to send the third service packet to a destination host.

In another example, a second PW is established between the second node and a third node, and the apparatus further includes a second processing unit and a second sending unit. The second processing unit is configured to perform SRv6 encapsulation on the third service packet to obtain a fourth service packet, where the fourth service packet includes the third service packet and information about the second PW; and the second sending unit is configured to send the fourth service packet to the third node through the second PW. In this example, the SRH of the second service packet includes the SID of the second node, the SID of the second node further corresponds to a second instruction action, and the second processing unit is configured to: perform SRv6 encapsulation on the third service packet based on the second instruction action, to obtain the fourth service packet.

It should be noted that, in the methods provided in the third aspect and the fourth aspect, an IPv6 DOH of the second service packet may carry the information about the first PW. Alternatively, the SRH of the second service packet may also carry the information about the first PW.

The information about the first PW may include an identifier of the first PW, a plurality of flags Flags, and a sequence number Sequence Number. The plurality of flags Flags and the sequence number Sequence Number may alternatively be referred to as a control word of the first PW.

It should be noted that, the first service packet may be a packet corresponding to a non-Ethernet service. The non-Ethernet service includes any one of the following services: a frame relay service, a time division multiplexing TDM service, or an asynchronous transfer mode ATM service. The TDM may include but is not limited to: an E1 service, an E3 service, a T1 service, a T3 service, a SONET service, or an SDH service.

It should be noted that, for an exemplary implementation and achieved effects of the packet transmission apparatus provided in the third aspect of this application, refer to related descriptions in the embodiment shown in the first aspect. Details are not described herein again.

It should be noted that, for an exemplary implementation and achieved effects of the packet transmission apparatus provided in the fourth aspect of this application, refer to related descriptions in the embodiment shown in the second aspect. Details are not described herein again.

According to a fifth aspect, this application provides a communication apparatus, where the communication apparatus includes a memory and a processor. The memory is configured to store program code, and the processor is configured to run instructions in the program code, to enable the communication apparatus to perform the method according to any one of the first aspect and the implementations of the first aspect, or to enable the communication apparatus to perform the method according to any one of the second aspect and the implementations of the second aspect.

According to a sixth aspect, this application provides a communication system, where the communication system includes a first node and a second node. The first node is configured to perform the method according to any one of the first aspect and the implementations of the first aspect; and the second node is configured to perform the method according to any one of the second aspect and the implementations of the second aspect.

According to a seventh aspect, this application provides a computer-readable storage medium, where the computer-readable storage medium stores instructions. When the instructions are run on a computer, the computer is enabled to perform the method according to any one of the first aspect and the implementations of the first aspect, or the computer is enabled to perform the method according to any one of the second aspect and the implementations of the second aspect.

According to an eighth aspect, this application provides a computer program product, including a program. When the program is run on a processor, the method according to any one of the first aspect and the implementations of the first aspect is implemented, or the method according to any one of the second aspect and the implementations of the second aspect is implemented.

BRIEF DESCRIPTION OF DRAWINGS

FIG. 1 is a schematic diagram of a structure of a service packet obtained based on an IP+UDP encapsulation manner;

FIG. 2 is a schematic diagram of a structure of a service packet obtained based on an L2TPv3 encapsulation manner;

FIG. 6a is a schematic diagram of a structure of an example of a service packet 2 according to an embodiment of this application;

FIG. 6b is a schematic diagram of a structure of another example of a service packet 2 according to an embodiment of this application;

FIG. 7a is a schematic diagram of a service packet 1 according to an embodiment of this application;

FIG. 7b is a schematic diagram of another service packet 1 according to an embodiment of this application;

DESCRIPTION OF EMBODIMENTS

Figure 3A:
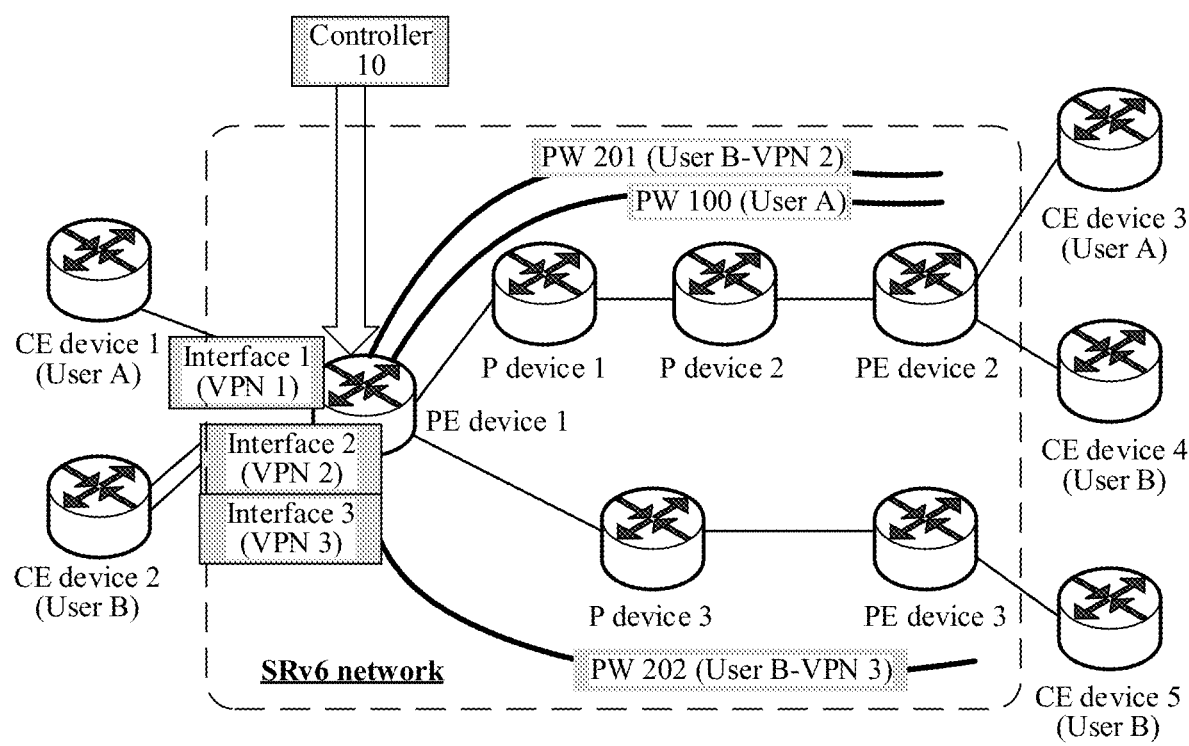
FIG. 3a is a schematic diagram of a framework of an application scenario according to an embodiment of this application.

The following describes embodiments in this application with reference to accompanying drawings. The network architecture and the service scenario described in embodiments of this application are intended to describe the embodiments of this application more clearly, and do not constitute a limitation on the embodiments of this application. Persons of ordinary skill in the art may know that: With the evolution of the network architecture and the emergence of new service scenarios, the embodiments of this application are also applicable to similar technical problems.

Ordinal numbers such as "1", "2", "3", "first", "second", and "third" in this application are used to distinguish between a plurality of objects, but are not intended to limit a sequence of the plurality of objects.

It should be understood that "A and/or B" mentioned in this application includes the following cases: Only A is included, only B is included, or both A and B are included.

A PW is a point-to-point connection established between PE devices, and a main function of the PW is to implement emulation of various services.

Currently, in a PW emulation method, a plurality of protocols are usually nested, so that a network device on a PW processes a service packet in a complex manner, and forwarding efficiency is low. The current PW emulation method is described by using two encapsulation manners provided in Request for Comments (RFC) 5087 (namely, TDM emulation over internet protocol (IP) (TDMoIP)) in PW emulation of the TDM service as examples: Method 1: IP+User Datagram Protocol (UDP) encapsulation method, and Method 2: Layer 2 Tunneling Protocol version 3 (L2TPv3) encapsulation manner.

For example, for the IP+UDP encapsulation manner defined in RFC 5087, in an SRv6 network, for a service packet obtained by an ingress PE device of a PW through encapsulation, refer to FIG. 1. As shown in FIG. 1, the service packet may include: an internet protocol version 6 (IPv6) header, a UDP header, a TDMoIP control word, and a payload. Optionally, a Real-time Transport Protocol (RTP) header may be further included between the UDP header and the TDMoIP control word. FIG. 1 is described by using an example in which the RTP header is included. For a specific format of the RTP header, refer to a related definition in RFC 3550. For the IPv6 header, refer to the first four lines of the service packet, and the IPv6 header includes: a version field, a traffic class field, a flow label field, a payload length, a next header field, a hop limit field, a source address field, and a destination address field. For the UDP header, refer to line 5 and line 6 of the service packet, and the UDP header includes: a source port number field, a destination port number field, a UDP length field, and a UDP checksum field. For the RTP header, refer to line 7, line 8, and line 9 of the service packet, and the RTP header includes: an RTP version (RTV) field, a padding flag (P) field, an extension flag (X) field, a contributing source counter (CC) field, a mark (M) field, a payload type (PT) field, an RTP sequence number field, and a timestamp field, and a synchronization source identifier (SSRC identifier) field. For the TDMoIP control word, refer to line 10 of the service packet, and the TDMoIP control word includes: a reserved (RES) field, a local failure (L) bit, a remote failure (R) bit, a defect modifier failure (M) field, a reserved (RES) field, a Length field, and a Sequence Number field.

For the TDM service emulation implemented in the IP+UDP encapsulation manner, a value of a source port number field or a destination port number field in the UDP header may be used to identify the PW, that is, the source port number or the destination port number in the UDP header is used as a pseudo wire label (PW Label). The PE devices at both ends of the PW need to agree with a same mapping relationship between the pseudo wire label and the specific pseudo wire. For example, if the source port number in the UDP header is used as the PW Label, the destination port number in the UDP header needs to be set to 0x085E (2142) allocated by the Internet Assigned Numbers Authority (IANA), to indicate that this service is a TDMoIP pseudo wire service. The TDMoIP control word is used to determine whether the payload is a payload corresponding to the pseudo wire service, and is further used to provide functions such as alarm indication and sequence preserving of the pseudo wire service when the payload is determined to be the payload corresponding to the pseudo wire service. For the specific encapsulation format and content, refer to related definitions in RFC 4385, and details are not described herein again.

It can be learned that, for the service packet obtained in the IP+UDP encapsulation manner, for the PE devices at both ends of the PW, UDP nesting and identification need to be additionally performed outside an IP layer, to realize the purpose of performing PW emulation on the TDM service. The service packet including multi-layer packet headers makes the processing process on the service packet performed by the PE devices at both ends of the PW complex, and forwarding efficiency of the service packet is low. In addition, it is stated in RFC 5087 that, for a network with an intermediate box device (for example, a network address translation (NAT) device), the intermediate box device modifies a port number in a UDP header of a service packet. Consequently, a source port number or a destination port number in the UDP header is used as a PW Label, and an egress PE device of a PW cannot correctly restore, based on the modified port number in the service packet, PW emulation of a TDM service. Therefore, the IP+UDP encapsulation manner cannot realize the purpose of PW emulation of the TDM service when the network includes the type of intermediate box device that modifies the port number.

For another example, for the L2TPv3 encapsulation manner defined in RFC 5087, for a service packet obtained by an ingress PE device of a PW through encapsulation, refer to FIG. 2. As shown in FIG. 2, the service packet may include an IPv6 header, an L2TPv3 header, a TDMoIP control word, and a payload. Optionally, an RTP header may be further included between the TDMoIP control word and the payload. For the IPv6 header, the TDMoIP control word, the RTP header, and the payload, refer to related descriptions in FIG. 1. For the L2TPv3 header, refer to line 5, line 6, and line 7 of the service packet, and the L2TPv3 header includes a session identifier (Session ID) field, an optional random Cookie 1 field, and an optional random Cookie 2 field. The Session ID field may carry a PW Label, and the Cookie 1 field and the Cookie 2 field are used to verify an association between a received frame and the PW.

It can be learned that, for the service packet obtained in the L2TPv3 encapsulation manner, for the PE devices at both ends of the PW, L2TPv3 protocol (refer to related descriptions in RFC 3931) nesting and identification need to be additionally performed outside an IP layer, to realize the purpose of performing PW emulation on the TDM service. The service packet including multi-layer packet headers makes the processing process on the service packet performed by the devices at both ends of the PW complex, and forwarding efficiency of the service packet is low. In addition, the RFC 5087 further defines a generic routing encapsulation (GRE) encapsulation manner. For PE devices at both ends of a PW, GRE protocol nesting and identification need to be additionally performed outside an IP layer. There is also a problem that multi-layer protocol nesting causes processing on a service packet performed by the PE devices at both ends of the PW complex, and forwarding efficiency of the service packet is low. In addition, in the foregoing encapsulation manner that requires protocol nesting, PE devices at both ends of a PW not only need to have an interface board for processing an IP packet, but also need to have a service board dedicated to processing other protocols nested in IP. For example, in a technical solution based on the L2TPv3 encapsulation manner, PE devices at both ends of a PW not only need to have an interface board, but also need to have a network processor (NP) or a field programmable gate array (FPGA) on a service board, to process the L2TPv3 header. It can be learned that the current implementations have high requirements on hardware performance and resources, and therefore cannot be widely applied to a PW emulation service.

Because IPv6 can provide more abundant addresses than internet protocol version 4 (IPv4), application scenarios of IPv6 will be increasingly wide. SRv6 that applies a segment routing (SR) technology to an IPv6 network plane can meet capability requirements of the mobile Internet, cloud services, and the like on a carrier network, and therefore will become a mainstream technology researched and applied by providers. Therefore, it is very important to provide a pseudo wire emulation mechanism applicable to an SRv6 network to implement transparent transmission of various services, thereby implementing interconnection of various services.

Based on this, an embodiment of this application provides a packet transmission method applicable to the SRv6 network. A service packet transmitted through a PW is processed by using a newly defined PW emulation mechanism, and a plurality of protocols do not need to be nested in an adopted encapsulation manner. In the method, when an ingress PE device of a PW receives a first service packet corresponding to the PW, the ingress PE device may perform SRv6 encapsulation on the first service packet to obtain a second service packet, where the second service packet includes the first service packet and information about the PW. In this way, the ingress PE device can send the second service packet to the egress PE device through the PW. After receiving the second service packet from the ingress PE device through the PW, an egress PE device of the PW performs SRv6 decapsulation on the second service packet to obtain the first service packet. It can be learned that, in the method, the processing mechanism corresponding to the PW is defined on the PE devices at both ends of the PW. In tis way, the ingress PE device can perform SRv6 encapsulation on a PW service, and encapsulate PW description information and a to-be-transmitted service packet into an actually sent service packet, so that the egress PE device performs SRv6 decapsulation on the service packet received through the PW to obtain the to-be-transmitted service packet. In this process, only the IP is used, and service packet transmission in the SRv6 network can be implemented without multi-protocol nesting, so that PW emulation services of various services are conveniently and quickly completed.

It should be noted that PW emulation in embodiments of this application is PW emulation of a non-Ethernet layer 2 service in the SRv6 network. The non-Ethernet layer 2 service may include, for example, but is not limited to, a frame relay service, a TDM service, an ATM service, a high-level data link control (HDLC) service, and a point-to-point protocol (PPP) service. A TDM service packet may include, for example, but is not limited to, an E1 service, a T1 service, an E3 service, a T3 service, a synchronous optical network (SONET) service, or a synchronous digital hierarchy (SDH) service.

For example, the scenario shown in FIG. 3a may include: a customer edge (CE) device 1, a CE device 2, a CE device 3, a CE device 4, a CE device 5, a PE device 1, a PE device 2, a PE device 3, a provider (P) device (also referred to as a core layer device) 1, a P device 2, and a P device 3, where the CE device 1 and the CE device 2 are connected to the PE device 1, the PE device 1 is connected to the PE device 2 through the P device 1 and the P device 2 in sequence, the PE device 2 is separately connected to the CE device 3 and the CE device 4, the PE device 1 is also connected to the PE device 3 through the P device 3, and the PE device 3 is connected to the CE device 5. A network between the PE device 1 and the PE device 2 and a network between the PE device 1 and the PE device 3 are both SRv6 networks. The CE device 1 and the CE device 3 correspond to a user A, and a service of the user A is transmitted through a PW 100. The PW 100 may be a path from the PE device 1 to the PE device 2 through the P device 1 and the P device 2 in sequence. The CE device 2, the CE device 4, and the CE device 5 correspond to the user B, and a service of the user B is transmitted through the PW 201 and the PW 202. The PW 201 may be a path from the PE device 1 to the PE device 2 through the P device 1 and the P device 2 in sequence, and the PW 202 may be a path from the PE device 1 to the PE device 3 through the P device 3.

Before PW emulation, each device in the SRv6 network may advertise a segment identifier (SID) of the device in the SRv6 network by using an Interior Gateway Protocol (IGP) or a border gateway protocol-link state (BGP-LS). In addition, the scenario shown in FIG. 3a may further include a controller 10. The controller 10 may send an SR policy to the PE device 1. The SR policy includes but is not limited to: an SR policy 0: a segment list 0 corresponding to the PW 100, an SR policy 1: a Segment list 1 corresponding to the PW 201, and an SR policy 2: a Segment list 2 corresponding to the PW 202. The Segment list 0 may include: a SID 0, a SID 11, a SID 12, and a SID 3. The Segment list 1 may include: a SID 1, the SID 11, the SID 12, and a SID 4. The Segment list 2 may include: a SID 2, a SID 13, and a SID 5. The SID 0, the SID 1, and the SID 2 are SIDs that are on the PE device 1 and that correspond to the PW 100, the PW 201, and the PW 202, the SID 3 and the SID 4 are SIDs that are on the PE device 2 and that correspond to the PW 100 and the PW 201, the SID 5 is a SID that is on the PE device 3 and that corresponds to the PW 202, and the SID 11, the SID 12, and the SID 13 are SIDs respectively corresponding to the P device 1, the P device 2, and the P device 3. It should be noted that the controller 10, for example, may send at least one SR policy to the PE device 1 by using a Path Computation Element Protocol (PCEP). In this way, preparation is made for the PE device 1 to receive and process a service packet, so that PW emulation can be performed in the SRv6 network.

It should be noted that the Segment list may include SIDs of devices between an ingress PE device and an egress PE device (including the ingress PE device and the egress PE device), or may include only SIDs of the ingress PE device and the egress PE device. Implementation of this embodiment of this application is not affected by the SIDs included in the Segment list. In this embodiment of this application, an example in which the Segment list includes the SIDs of the devices between the ingress PE device and the egress PE device (including the ingress PE device and the egress PE device) is used for description.

It should be noted that, if information 0 of the PW 100 is carried in the SID 0 (for example, a variable Arguments field in the SID 0) and information 1 of the PW 201 is carried in the SID 1 (for example, a variable Arguments field in the SID 1), the SID 0 and the SID 1 may be different SIDs. If the information 0 of the PW 100 is not carried in the SID 0, and the information 1 of the PW 201 is not carried in the SID 1, the SID 0 and the SID 1 may be a same SID. Similarly, the SID 3 and the SID 4 may be a same SID or different SIDs. The following uses an example in which the SID 0 and the SID 1 are different, and the SID 3 and the SID 4 are different for description.

In an example, for an ingress PE device, namely, the PE device 1, of the PW 100, the PW 201, and the PW 202, instruction actions separately corresponding to three SR policies may be configured. To be specific, the following may be configured on the PE device 1: an instruction action 0 corresponding to the SR policy 0, an instruction action 1 corresponding to the SR policy 1, and an instruction action 2 corresponding to the SR policy 2. The instruction action 0 may instruct the PE device 1 to encapsulate the Segment list 0 corresponding to the PW 100 and information 0 of the PW 100 into a service packet belonging to the PW 100. Similarly, the instruction action 1 may instruct the PE device 1 to encapsulate the Segment list 1 corresponding to the PW 201 and information 1 of the PW 201 into a service packet belonging to the PW 201; and the instruction action 2 may instruct the PE device 1 to encapsulate the Segment list 2 corresponding to the PW 202 and information 2 of the PW 202 into a service packet belonging to the PW 202. For an egress PE device, namely, the PE device 2, of the PW 100 and the PW 201, instruction actions separately corresponding to SIDs corresponding to the two PWs may be configured. To be specific, the following may be configured on the PE device 2: the instruction action 3 corresponding to the SID 3, and the instruction action 4 corresponding to the SID 4. The instruction action 3 may instruct the PE device 2 to decapsulate the service packet belonging to the PW 100. Similarly, the instruction action 4 may instruct the PE device 2 to decapsulate the service packet belonging to the PW 201. For an egress PE device, namely, the PE device 3, of the PW 202, an instruction action 5 corresponding to the SID 5 corresponding to the PW 202 may be configured. The instruction action 5 may instruct the PE device 3 to decapsulate the service packet belonging to the PW 202.

Figure 4:
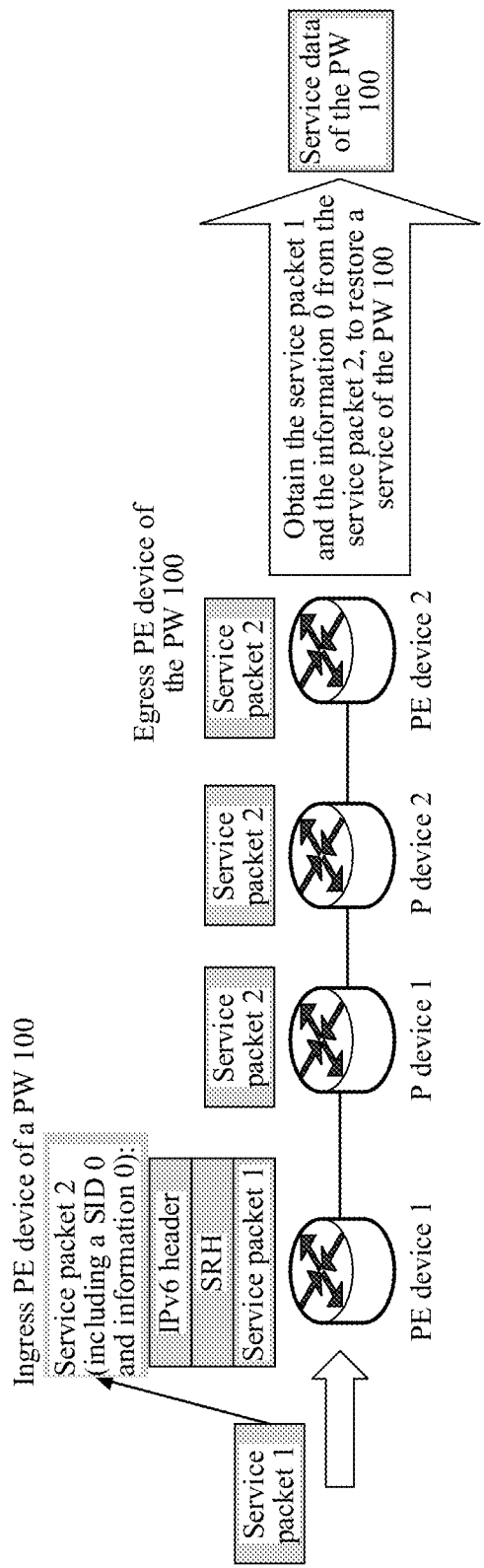
FIG. 4 is a schematic diagram of an emulation process of a PW 100 in FIG. 3a according to an embodiment of this application.
Figure 5A:
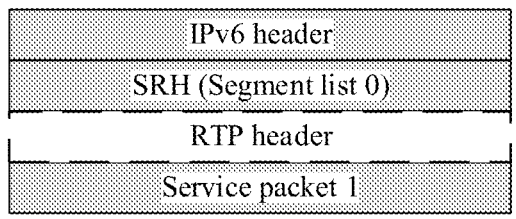
FIG. 5a is a schematic diagram of a structure of a service packet 2 according to an embodiment of this application.

In this example, for a service packet 1 that is sent by the CE device 1 to the PE device 1 and that needs to pass through the PW 100, refer to FIG. 4, a PW emulation process may include the following steps: S11: The PE device 1 receives the service packet 1 from an interface 1 connected to the CE device 1, and determines that the service packet 1 needs to be transmitted to the PE device 2 through the PW 100, and a next hop is the SR policy 0. S12: The PE device 1 encapsulates a service packet 1 based on the instruction action 0 corresponding to the SR policy 0, to obtain a service packet 2. Refer to FIG. 5*a*, the service packet 2 includes an IPv6 header, a segment routing header (SRH), and the service packet 1. Optionally, an RTP header may be further included between the SRH and the service packet 1. The SRH of the service packet 2 may include the Segment list 0 corresponding to the PW 100; and the service packet 2 may further include the information 0, where the information 0 describes an attribute of the PW 100. S13: The PE device 1 sends the service packet 2 to the PE device 2 through the PW 100. S14: The PE device 2 receives the service packet 2, and determines that the last SID 3 in the Segment list in the SRH of the service packet 2 is a locally configured SID corresponding to the PW 100, to determine that the PE device 2 is an egress PE device of the PW 100, and decapsulates the service packet 2 based on the instruction action 3 corresponding to the SID 3, to obtain the service packet 1 and the information 0. Optionally, the process may further include: S15: The PE device 2 restores a service corresponding to the PW 100 based on the service packet 1 and the information 0, and sends restored service data to a corresponding service module or interface (for example, a TDM service module or interface) on the PE device 2, to complete subsequent processing of the service. For example, the PE device 2 sends processed service data to user equipment (namely, a destination host of the service data) corresponding to the user A by using the CE device 3. It should be noted that, for S11, the PE device 1 may bind the PW 100 to the interface 1 connected to the CE device 1, or may bind the PW 100 to a virtual private network (VPN) 1 corresponding to the interface 1. In this case, the PE device 1 may determine, based on the interface 1 for receiving the service packet 1, that a PW corresponding to the service packet 1 is the PW 100. Then, the PE device 1 may determine that the egress PE device of the PW 100 is the PE device 2. Therefore, the PE device 1 may use an address of the PE device 2 as a destination address, search, based on the destination address and a color, a local routing and forwarding table of the PE device 1 for a routing and forwarding entry that matches the destination address and the color, and obtain the next hop of the service packet 1, namely, the SR policy 0, from the matched routing and forwarding entry. In this way, preparation is made for the PE device 1 to perform SRv6 encapsulation on the service packet 1 based on the instruction action 0 corresponding to the SR policy 0 in S12.

In another example, for an ingress PE device, namely, the PE device 1, of the PW 100, the PW 201, and the PW 202, instruction actions separately corresponding to three SIDs may also be configured. To be specific, the following may be configured on the PE device 1: an instruction action 0 corresponding to the SID 0, an instruction action 1 corresponding to the SID 1, and an instruction action 2 corresponding to the SID 2.

Figure 5B:
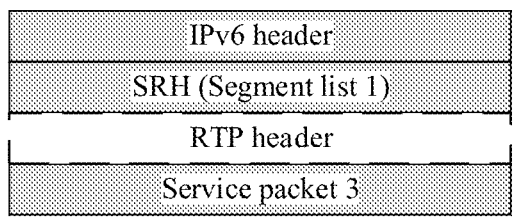
FIG. 5b is a schematic diagram of a structure of a service packet 4' according to an embodiment of this application.

In this example, for a service packet 3 that is sent by the CE device 2 to the PE device 1 and that needs to pass through the PW 201, a PW emulation process may include the following steps: S21: The PE device 1 receives the service packet 3 from an interface 2 connected to the CE device 2, and determines that the service packet 3 needs to be transmitted to the PE device 2 through the PW 201, and a next hop is the SR policy 1. S22: The PE device 1 processes the service packet 3 based on the SR policy 0, to obtain a service packet 4, where the service packet 4 includes a Segment list 1, and a destination address field in the IPv6 header is the SID 1. S23: The PE device 1 processes the service packet 4 based on the instruction action 1 corresponding to the SID 1, to obtain a service packet 4'. For the service packet 4', refer to FIG. 5*b*. An SRH of the service packet 4' may include the Segment list 1 corresponding to the PW 201; and the service packet 4' may further include information 1. S24: The PE device 1 sends the service packet 4' to the PE device 2 through the PW 201. S25: The PE device 2 receives the service packet 4', and determines that the last SID 4 in the Segment list in the SRH of the service packet 4' is a locally configured SID corresponding to the PW 201, to determine that the PE device 2 is an egress PE device of the PW 201, and decapsulates the service packet 4' based on the instruction action 4 corresponding to the SID 4, to obtain the service packet 3 and the information 1. Optionally, the process may further include: S26: The PE device 2 restores a service corresponding to the PW 201 based on the service packet 3 and the information 1, and sends restored service data to a corresponding service module or interface on the PE device 2, to complete subsequent processing of the service. For example, the PE device 2 sends processed service data to user equipment corresponding to the user B by using the CE device 4. It should be noted that, in this example, the SR policy 0 is a common SR policy, and corresponds to a common instruction action of SRv6 encapsulation. The PE device 1 may perform common SRv6 encapsulation on the service packet based on the SR policy 1. The SID 1 in the SR policy 1 is a special SID, and corresponds to a special instruction action 1 that needs to be executed by the ingress PE device of the PW. For S22, after the PE device 1 determines the next hop, namely, the SR policy 1, of the service packet 3, the PE device 1 may encapsulate the SRH into the service packet 3 based on the SR policy 1, where the SRH includes the Segment list 1; and fill the SID 1 corresponding to the PE device 1 in the Segment list 1 into the destination address field of the IPv6 header, to obtain the service packet 4. Then, the PE device 1 locally performs a local table lookup based on the destination address being the SID 1, to determine that the SID 1 corresponds to the instruction action 1, executes the instruction action 1 corresponding to the SID 1, and encapsulates the information 1 of the PW into the service packet 4 to obtain the service packet 4'.

Figure 3B:
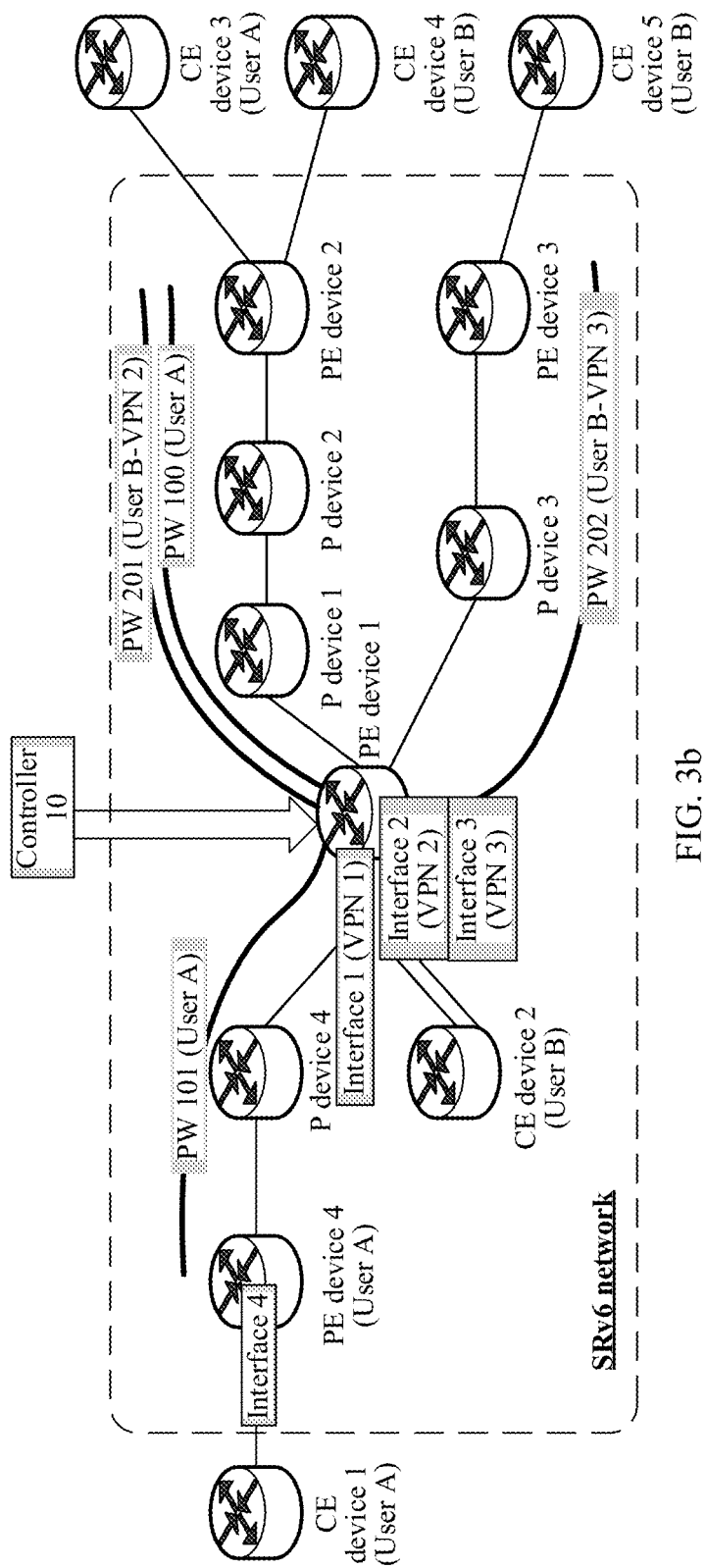
FIG. 3b is a schematic diagram of a framework of another application scenario according to an embodiment of this application.

For example, this embodiment of this application is further applicable to a scenario shown in FIG. 3*b*. In comparison with the scenario shown in FIG. 3*a*, in the scenario shown in FIG. 3*b*, a PE device 4 and a P device 4 are further included between the CE device 1 and the PE device 1. The CE device 1 is connected to the PE device 4, and the PE device 4 is connected to the PE device 1 through the P device 4. A network between the PE device 1 and the PE device 4 is also an SRv6 network. The CE device 1 and the CE device 3 correspond to the user A, and a service of the user A is transmitted through the PW 101 and the PW 100 respectively. The PW 101 may be a path from the P device 4 to the PE device 1 through the P device 4.

In an example, in the scenario shown in FIG. 3*b*, the PE device 4 may obtain an SR policy 4. The SR policy 4 includes a Segment list 4. The Segment list 4 may include a SID 40, a SID 14, and a SID 0'. The SID 40 is a SID that is on the PE device 4 and that corresponds to the PW 101, the SID 14 is a SID corresponding to the P device 14, and the SID 0' is a SID corresponding to the PE device 1. For an ingress PE device, namely, the PE device 4, of the PW 101, a corresponding instruction action 40 may be configured for the SR policy 4. The instruction action 40 may instruct the PE device 4 to encapsulate the Segment list 4 corresponding to the PW 101 and information 10 of the PW 101 into a service packet belonging to the PW 101. For an intermediate PE device (to be specific, an egress PE device of the PW 101 and ingress PE device of the PW 100), namely, the PE device 1, of segmented PWs, a corresponding instruction action 41 and a corresponding instruction action 42 may be separately configured for the SID 0' of the PE device 1. The instruction action 41 may instruct the PE device 1 to perform SRv6 decapsulation on the service packet belonging to the PW 101, and the instruction action 42 may instruct the PE device 1 to perform SRv6 encapsulation on a service packet belonging to the PW 100.

In this example, for a service packet 5 that is sent by the CE device 1 to the PE device 4 and that needs to pass through the PE 101 and the PW 100 sequentially, a PW emulation process may include the following steps: S31: The PE device 4 receives the service packet 5 from an interface 4 connected to the CE device 1, and determines that the service packet 5 needs to be transmitted to the PE device 1 through the PW 101, and a next hop is the SR policy 4. S32: The PE device 4 encapsulates the service packet 5 based on the instruction action 40 corresponding to the SR policy 4, to obtain a service packet 6. An SRH of the service packet 6 may include the Segment list 4 corresponding to the PW 101; and the service packet 6 may further include information 4, where the information 4 describes an attribute of the PW 101. S33: The PE device 4 sends the service packet 6 to the PE device 1 through the PW 101. S34: The PE device 1 receives the service packet 6, and determines that the last SID 0' in the Segment list in the SRH of the service packet 6 is a locally configured SID corresponding to the PW 101 and the PW 100, to determine that the PE device 1 is the egress PE device of the PW 101, and decapsulates the service packet 6 based on the instruction action 41 corresponding to the SID 0', to obtain the service packet 5 and the information 4. Optionally, after S34, the method may further include: S35: The PE device 1 restores, based on the service packet 5 and the information 4, a service corresponding to the PW 101, to obtain restored service data (for example, the service packet 5). Then, the process may further include: S36: The PE device 1 encapsulates the service packet 5 based on the instruction action 42 corresponding to the SID 0', to obtain a service packet 6'. The SRH of the service packet 6' may include a Segment list 0 corresponding to the PW 100; and the service packet 6' may further include information 0, where the information 0 describes an attribute of the PW 100. S37: The PE device 1 sends the service packet 6' to the PE device 2 through the PW 100. S38: The PE device 2 receives the service packet 6', and determines that the last SID 3 in the Segment list in an SRH of the service packet 6' is a locally configured SID corresponding to the PW 100, to determine that the PE device 2 is an egress PE device of the PW 100, and decapsulates the service packet 6' based on the instruction action 42 corresponding to the SID 0', to obtain the service packet 5 and the information 0. Optionally, after S38, the method may further include: S39: The PE device 2 restores, based on the service packet 5 and the information 0, a service corresponding to the PW 100, to obtain restored service data.

In this embodiment of this application, the information about the PW may also be referred to as metadata, and may be information for describing a PW attribute. The information about the PW includes a function that can implement a control word (such as the TDMoIP control word) in a current encapsulation manner in PW emulation, and the information about the PW also includes information (similar to the PW Label) that can identify the PW. Therefore, the information about the PW in this embodiment of this application may include but is not limited to a plurality of flags, a Sequence Number, and a PW ID. In an example, the information about the PW in a packet may include, for example, the following fields: a flags field, a Length field, a reserved (Rvd) field, a Sequence Number field, and a PW ID field. The Flags field may include but is not limited to: an L bit, an R bit, an N bit, and a P bit. Optionally, when a PW emulation service is segmented, the Flags field may further include an FRG bit that indicates service segments. A value of the Length field indicates a length of the service packet 1. A value of the Sequence Number field is for sorting data frames included in the service packet 1. A value of the PW ID field is for uniquely identifying the PW. For example, for the service packet 1 transmitted through the PW 100, a value of a PW ID field in the information 0 may be equal to 100, and is for identifying that the service packet 1 is transmitted through the PW 100, to implement an emulation service of the PW 100.

For the information 0 of the service packet 2 shown in FIG. 5*a*, in an example, the service packet 2 may further include an IPv6 extension header. In the IPv6 extension header, the information 0 is carried in a newly added type length value (TLV) field. An IPv6 option header may be a hop-by-hop option header (HBH) or a destination option header (DOH). An example in which the information 0 is carried in a DOH extension TLV field in the service packet 2 is used. For the service packet 2, refer to FIG. 6*a*. In another example, an SRH TLV field may be further newly added to the SRH in the service packet 2, and the SRH TLV field carries the information 0. For the service packet 2, refer to FIG. 6*b*.

For the service packet 1 in the service packet 2 shown in FIG. 5*a*, a TDM circuit emulation service (CES) is used as an example. If the service packet 1 is a structured TDM CES, for the service packet 1, refer to FIG. 7*a*. The structured TDM CES may include, for example, n data frames (Frame 1 # to Frame n #), and each data frame includes N slots (TS 1 to TS N). In this example, if the service packet 2 is shown in FIG. 6*a*, a value of a Next Header field in an IPv6 DOH indicates that a payload (namely, the service packet 1) of the service packet 2 is encapsulated with TDM data (namely, the foregoing structured TDM CES) in an NxDS0 format; or if the service packet 2 is shown in FIG. 6*b*, a value of a Next Header field in an SRH field indicates that a payload of the service packet 2 is the foregoing structured TDM CES. In another example, if the service packet 1 is a CES of a SONET or an SDH, refer to FIG. 7*b* for the service packet 1, and the payload may include, for example, SONET data or SDH data. In this example, if the service packet 2 is shown in FIG. 6*a*, a value of a Next Header field in an IPv6 DOH indicates that a payload of the service packet 2 is the SONET data or the SDH data; or if the service packet 2 is shown in FIG. 6*b*, a value of a Next Header field in an SRH field indicates that a payload of the service packet 2 is the SONET data or the SDH data.

It should be noted that an information carrying manner is irrelevant to specific content of the service packet 1 (namely, the payload) in the service packet 2, and may be designed based on an actual requirement. For example, the payload of the service packet 2 shown in FIG. 6a may be shown in FIG. 7a, or may be shown in FIG. 7b. For another example, the payload of the service packet 2 shown in FIG. 6b may be shown in FIG. 7a, or may be shown in FIG. 7b.

It should be noted that, processing of a service packet corresponding to the PW 201 that belongs to a VPN 2 on the user B and processing of a service packet corresponding to the PW 202 that belongs to a VPN 3 on the user B are similar to the foregoing processing of the service packet corresponding to the PW 100 that belongs to the VPN 1 on the user A. Details are not described again in this embodiment of this application. The CE device 2 of the user B may be connected to an interface 2 and an interface 3 of the PE device 1, the interface 2 and the interface 3 respectively correspond to the VPN 2 and the VPN 3, and the interface 2 and the interface 3 may be two logical interfaces implemented by using one or two physical interfaces.

It should be noted that, in this embodiment of this application, a device type and a device quantity included between PE devices are merely examples. For example, a PE device may alternatively be configured at locations of the P device 1, the P device 2, and the P device 3. A quantity of P devices or PE devices included between the PE device 1 and the PE device 2 and a quantity of P devices or PE devices included between the PE device 1 and the PE device 3 are not specifically limited in this embodiment of this application.

It can be learned that, according to the method provided in this embodiment of this application, a packet processing mechanism corresponding to the PW is defined on PE devices at both ends of the PW. For example, a corresponding instruction action is configured on an ingress PE device for an SR policy corresponding to the PW; or a corresponding instruction action is configured on the ingress PE device for a SID corresponding to the PW, and the flexible and programmable instruction action corresponding to the SR policy or the SID is used to perform SRv6 encapsulation on the PW service packet and carry information describing the PW. For another example, a corresponding instruction action is configured on an egress PE device for a SID corresponding to the PW, and SRv6 decapsulation is performed on the PW service packet by using the flexible and programmable instruction action corresponding to the SID. This implements fast and convenient processing of the service packet of the PW emulation service in the SRv6 network on the PE devices at both ends of the PW without multi-protocol nesting, and improves efficiency of processing the service packet by the PE devices at both ends of the PW. In addition, a problem that the current IP+UDP encapsulation manner cannot implement PW emulation in a network with an intermediate box device is resolved. In addition, the method only requires that the PE devices at both ends of the PW have interface boards for processing IP packets, and does not need to have service boards for processing other protocols, thereby lowering requirements on hardware performance, resources, and the like of the PE devices at both ends of the PW, and improving an application scope of the PW emulation in the SRv6 network.

It should be noted that, in this embodiment of this application, the PE device may be a network device such as a switch, a router, or a firewall. A control plane of the PE device (for example, a central processing unit (CPU) of the PE device) can process PW information (for example, PW information carried in a TLV field of an IPv6 extension header or PW information carried in an SRH TLV field) in a service packet. A forwarding plane of the PE device (such as an NP or an FPGA of the PE device) can encapsulate and decapsulate a received service packet based on the PW to implement PW emulation. The CE device may be a device with a private network access function, for example, may be a device such as a switch, a router, an Internet of Things (IoT) terminal, or a host.

It should be noted that, in this embodiment of this application, the endpoint PE devices of the PW are the same as the endpoint PE devices of the SRv6 network. To be specific, the first SID and the last SID in the Segment list in the SR policy respectively correspond to the ingress PE device of the PW and the egress PE device of the PW.

It should be noted that, in this embodiment of this application, to ensure reliability of PW emulation, before the egress PE device of the PW decapsulates the received service packet, the egress PE device may further verify the PW, for example, obtain a PW ID from the received service packet, and search a control plane to learn whether a PW corresponding to the PW ID is configured. If the PW is configured, the verification succeeds, and SRv6 decapsulation is performed on the received service packet; otherwise, if the PW is not found, the verification fails, and the service packet is discarded.

The foregoing uses the scenarios shown in FIG. 3a and FIG. 3b as examples to describe application of the embodiments of this application in actual scenarios. The following describes a packet transmission method provided in embodiments of this application with reference to the accompanying drawings.

Figure 8:
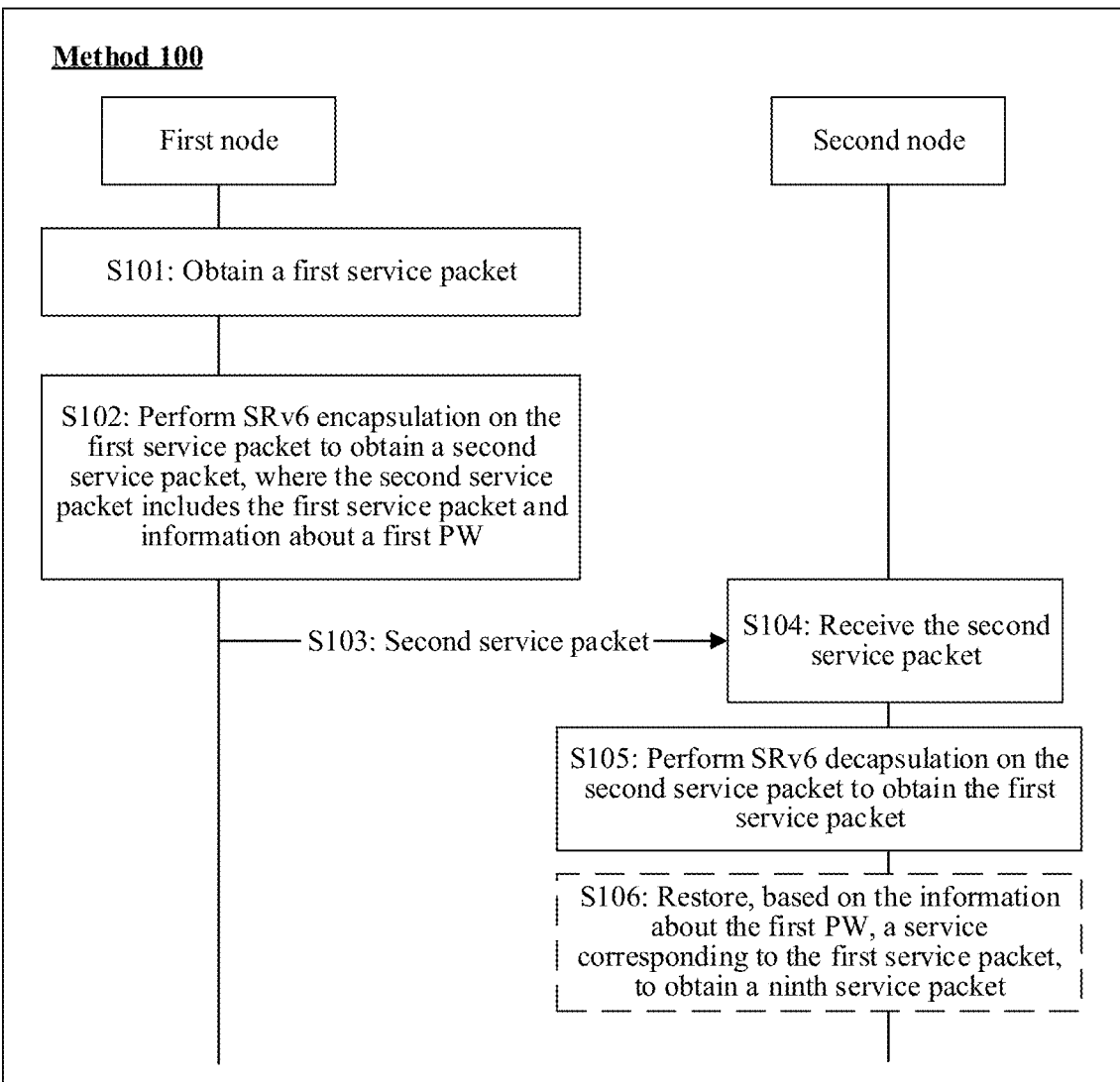
FIG. 8 is a schematic flowchart of a packet transmission method 100 according to an embodiment of this application.

FIG. 8 is a schematic flowchart of a packet transmission method 100 according to an embodiment of this application. The method 100 is applicable to PW emulation of a service packet in an SRv6 network, and is described by using interaction between nodes (namely, the first node and the second node) at both ends of a first PW. The first node may also be referred to as an ingress PE device of the first PW, and the second node may also be referred to as an egress PE device of the first PW. For example, the first PW in the method 100 is the PW 100 in FIG. 3a or FIG. 3b, the first node may be the PE device 1 in FIG. 3a or FIG. 3b, and the second node may be the PE device 2 in FIG. 3a or FIG. 3b. For another example, the first PW in the method 100 is the PW 201 in FIG. 3a or FIG. 3b, the first node may be the PE device 1 in FIG. 3a or FIG. 3b, and the second node may be the PE device 2 in FIG. 3a or FIG. 3b. For still another example, the first PW in the method 100 is the PW 202 in FIG. 3a or FIG. 3b, the first node may be the PE device 1 in FIG. 3a or FIG. 3b, and the second node may be the PE device 3 in FIG. 3a or FIG. 3b. For yet another example, the first PW in the method 100 is the PW 101 in FIG. 3b, the first node may be the PE device 4 in FIG. 3b, and the second node may be the PE device 1 in FIG. 3b. Refer to FIG. 8. For example, the method 100 may include S101 to S105.

S101: The first node obtains a first service packet.

The first service packet may be any packet corresponding to a service on which PW emulation can be performed according to this embodiment of this application, for example, may be a packet corresponding to a non-Ethernet Layer 2 service. The non-Ethernet service may include, but not limited to, any one of the following services: a frame relay service, a TDM service, an ATM service, an HDLC service, or a PPP service. The TDM service may include but is not limited to: an E1 service, an E3 service, a T1 service, a T3 service, a SONET service, or an SDH service. Each type of the non-Ethernet service may include a first service packet of at least one structure. For example, if the non-Ethernet service is the TDM, the first service packet may be a structured TDM CES, and for a specific format, refer to FIG. 7a. Alternatively, the first service packet may be a SONET CES or an SDH CES, and for a specific format, refer to FIG. 7b.

The first service packet may be a to-be-transmitted service packet received by the first node from a service side. For example, the first service packet may be the service packet 1 received by the PE device 1 from the CE device 1 in the scenario shown in FIG. 3a. Alternatively, in a scenario of segmented PWs, if the first node is an intermediate PE device of two PW segments, the first service packet may alternatively be a packet obtained by the first node by processing a received service packet. For example, the first service packet may be the service packet 5 obtained by the PE device 1 by performing SRv6 decapsulation on the service packet 6 received from the PE device 4 through the PW 101 in the scenario shown in FIG. 3b.

During an exemplary implementation, the first node may locally prestore a correspondence between each interface and PW, and the correspondence may be represented by, for example, an edge-to-edge pseudo wire emulation (PWE3) forwarding table on the first node. In one case, the PWE3 forwarding table may include a direct correspondence between an interface and a PW. In this case, after receiving the first service packet, the first node may directly determine, based on an interface through which the first node receives the first service packet, a PW corresponding to the first service packet. Alternatively, in another case, the PWE3 forwarding table may include a correspondence among an interface, a VPN, and a PW. In this case, after receiving the first service packet, the first node may determine, based on an interface through which the first node receives the first service packet, a VPN corresponding to the first service packet, to determine, based on the VPN, a PW that the first service packet needs to pass through. For example, in the scenario shown in FIG. 3a, the PE device 1 may store a correspondence between the interface 1 and the PW 100, a correspondence between the interface 2 and the PW 201, and a correspondence between the interface 3 and the PW 202. When receiving the first service packet from the interface 1, the PE device 1 may determine that the first service packet needs to be transmitted through the PW 100. For another example, the PE device 1 may store a correspondence among the interface 1, the VPN 1, and the PW 100, a correspondence among the interface 2, the VPN 2, and the PW 201, and a correspondence among the interface 3, the VPN 3, and the PW 202. When receiving the first service packet from the interface 1, the PE device 1 may determine that the first service packet belongs to the VPN 1, to determine, based on the VPN 1, that the first service packet needs to be transmitted through the PW 100.

In another aspect, the first node further has a routing and forwarding table locally. Therefore, after receiving the first service packet, the first node may determine, based on the PWE3 forwarding table on the first node, a PW bound to the interface, use an address of an egress PE device (namely, the second node) of the PW as a destination address of the first service packet, search a local routing and forwarding table of the first node for a routing and forwarding entry that matches the destination address and a color, and obtain a next hop (for example, may be an SR policy corresponding to the determined PW) of the first service packet from the matched routing and forwarding entry. For example, in the scenario shown in FIG. 3a, the routing and forwarding table of the PE device 1 includes a route and forwarding entry 1: a correspondence among a route prefix 1, a color 1, and the SR policy 0 corresponding to the PW 100. In this case, when receiving the first service packet from the interface 1, the PE device 1 may determine that the first service packet is transmitted through the PW 100, and an address of the egress PE device (namely, the PE device 2) of the PW 100 is used as a destination address 1, to obtain the destination address 1 and the color 1 of the first service packet, where the destination address 1 and the route prefix 1 belong to a same network segment. In this case, the PE device 1 can determine that the first service packet matches the routing and forwarding entry 1, to determine that the first service packet is processed according to the SR policy 0 corresponding to the PW 100. It should be noted that there is usually only one PW for one user between a pair of PE devices.

In some other possible implementations, in addition to the first PW, a third PW belonging to another user may further be included between the first node and the second node. In this case, the method 100 may further include: The first node receives a fifth service packet. For example, in the scenario shown in FIG. 3a, in addition to the PW 100, the PW 201 is further included between the PE device 1 and the PE device 2. When receiving the fifth service packet from the interface 2, the PE device 1 may determine that the fifth service packet needs to be transmitted through the PW 201. The routing and forwarding table of the PE device 1 may further include a route and forwarding entry 2: a correspondence among a route prefix 2, a color 2, and the SR policy 1 corresponding to the PW 201. In this case, the PE device 1 obtains a destination address 2 (namely, an address of an egress PE device 2 of the PW 201) and the color 2 of the fifth service packet, where the destination address 2 and the route prefix 2 belong to a same network segment. In this case, the PE device 1 can determine that the fifth service packet matches the routing and forwarding entry 2, to determine that the fifth service packet is processed according to the SR policy 1 corresponding to the PW 201. It should be noted that the third PW emulation process performed by the first node and the second node on the fifth service packet is similar to the first PW emulation process performed on the first service packet. For an exemplary implementation, refer to descriptions in the embodiment shown in FIG. 9 below.

In still some other possible implementations, a fourth PW may further be included between the first node and another second node (referred to as a fourth node below). In this case, the method 100 may further include: A first PE device receives a seventh service packet. For example, in the scenario shown in FIG. 3a, the PW 202 is included between the PE device 1 and the PE device 3. When receiving the seventh service packet from the interface 3, the PE device 1 may determine that the seventh service packet needs to be transmitted through the PW 202. The routing and forwarding table of the PE device 1 includes a route and forwarding entry 3: a correspondence among a route prefix 3, a color 3, and the SR policy 2 corresponding to the PW 202. In this case, the PE device 1 obtains a destination address 3 (namely, an address of an egress PE device 3 of the PW 202) and the color 3 of the seventh service packet, where the destination address 3 and the route prefix 3 belong to a same network segment. In this case, the PE device 1 can determine that the seventh service packet matches the routing and forwarding entry 3, to determine that the seventh service packet is processed according to the SR policy 2 corresponding to the PW 202. It should be noted that the fourth PW emulation process performed by the first node and the fourth node on the seventh service packet is similar to the first PW emulation process performed by the first node and the second node on the first service packet. For an exemplary implementation, refer to descriptions in the embodiment shown in FIG. 10 below.

S102: The first node performs SRv6 encapsulation on the first service packet to obtain a second service packet, where the second service packet includes the first service packet and information about the first PW.

Both the first node and the second node make the following preparations to implement the method provided in this embodiment of this application.

First, an instruction action corresponding to a PW in the device is separately defined in the first node and the second node, and the instruction action instructs to process a service packet to which the PW belongs. The instruction action configured on the first node serving as an ingress PE device of the first PW may be implemented by using instructions or pseudo-code of the SRv6 policy, or may be implemented by using instructions or pseudo-code corresponding to a SID of the first node. The instruction action configured on the second node serving as an egress PE device of the PW may be implemented by using instructions or pseudo-code corresponding to a SID of the second node.

The first node serves as the ingress PE device of the first PW. In an example, the first node may configure a correspondence between an SR policy corresponding to the first PW and a first instruction action, where the first instruction action instructs the first node to perform S102. To be specific, the first node performs SRv6 encapsulation on the first service packet based on the first instruction action, to obtain the second service packet. Corresponding to the scenario shown in FIG. 3a, the first PW is the PW 100, the first node is the PE device 1, the second node is the PE device 2, the first service packet is the service packet 1, and the second service packet is the service packet 2. In this case, for S102, refer to related descriptions of S12. Alternatively, in another example, the SR policy on the first node may not correspond to the instruction action defined in this embodiment of this application, but a corresponding second instruction action is configured for the first SID that is on the first node and that corresponds to the first PW, where the second instruction action instructs the first node to perform S102. Between S101 and S102, the method 100 may further include: The first node processes the first service packet based on the SR policy that matches the first service packet, to obtain a third service packet, where the third service packet includes a Segment list 0 corresponding to the first PW, and a destination address of the third service packet is the first SID of the first node. In this case, S102 may include: The first node processes the third service packet based on the second instruction action corresponding to the first SID, to obtain the second service packet. Corresponding to the scenario shown in FIG. 3a, the first PW is the PW 201, the first node is the PE device 1, the second node is the PE device 2, the first service packet is the service packet 3, the third service packet is the service packet 4, and the second service packet is the service packet 4'. In this case, for S102, refer to related descriptions of S22 and S23. For a structure of the second service packet, refer to the foregoing FIG. 5a, FIG. 5b, FIG. 6a, and FIG. 6b.

The first node serves as an ingress PE device of the first PW and an egress PE device of a second PW, where the second PW is a PW between a third node and the first node. In an example, the first node may configure different corresponding instruction actions for a second SID corresponding to both the first PW and the second PW, for example, configure a correspondence between the second SID and a third instruction action. In this case, when the first node receives a fourth service packet from the third node through the second PW, S101 may include: The first node performs SRv6 decapsulation on the fourth service packet based on the third instruction action corresponding to the second SID, to obtain the first service packet. The first node further configures a correspondence between the second SID and a fourth instruction action. In this case, S102 may include: The first node performs SRv6 encapsulation on the first service packet based on the fourth instruction action corresponding to the second SID, to obtain the second service packet. Corresponding to the scenario shown in FIG. 3b, the first PW is the PW 100, the second PW is the PW 101, the first node is the PE device 1, the second node is the PE device 2, the third node is the PE device 4, the fourth service packet is the service packet 6, the first service packet is the service packet 5, and the second service packet is the service packet 6'. In this case, for S101, refer to related descriptions of S34, and for S102, refer to the related descriptions of S36.

For the ingress PE device, in an example, a corresponding SID may be configured for each PW on the ingress PE device, and a Function in the SID carries an instruction action for processing a service packet to which the PW belongs. For example, the ingress PE device may respectively configure corresponding SIDs for the first PW, the third PW, and the fourth PW on the ingress PE device, where a Function in a SID corresponding to the first PW carries an instruction action a for processing a service packet (for example, the first service packet) to which the first PW belongs, a Function in a SID corresponding to the third PW carries an instruction action b for processing a service packet (for example, the fifth service packet) to which the third PW belongs, and a Function in the SID corresponding to the fourth PW carries an instruction action c for processing a service packet (for example, the seventh service packet) to which the fourth PW belongs.

In the second service packet, a payload carries the first service packet, an SRH includes a Segment list corresponding to the first PW, and an IPv6 extension header (for example, an IPv6 DOH) or the SRH carries information about the first PW.

For example, the first instruction action may instruct to encapsulate the first service packet into the payload of the second service packet; the first instruction action may further instruct to encapsulate the SRH outside the first service packet, where the SRH includes the Segment list corresponding to the first PW; and the first instruction action may further instruct to carry, by using an extended TLV field in the second service packet, information for describing the first PW. In one case, the information about the first PW may be carried in a TLV field in an IPv6 extension header (for example, an IPv6 HBH or an IPv6 DOH) in the second service packet. In this case, a value of a Next Header field in the IPv6 extension header indicates a type of the payload (namely, the first service packet) of the second service packet, that is, a service type of the first PW emulation. In another case, the information about the first PW may alternatively be carried in an SRH TLV field in the second service packet. In this case, a value of a Next Header field of the SRH indicates the type of the payload of the second service packet. The type of the payload (or referred to as a type of the first service packet) of the second service packet may be, for example, a TDM or an ATM, or, for another example, may be a structured CES or an SDH CES.

In another example, the ingress PE device may configure corresponding SIDs for PWs with different egress PE devices, and configure a same SID for at least one PW with a same egress PE device, where a Function in the SID carries an instruction action for processing a service packet to which the at least one PW corresponding to the egress PE device belongs. For example, the ingress PE device may configure, on the ingress PE device, a corresponding SID a for the first PW and the third PW whose egress PE devices are both the second node, and configure a corresponding SID b for the fourth PW whose egress PE device is the fourth node. A Function in the SID a carries common indication content of an instruction action a and an instruction action b, and a Function in the SID b carries an instruction action c. In this example, Segment lists corresponding to the first PW and the third PW are the same, and the instruction action a not only instructs to encapsulate a received service packet corresponding to the first PW or the third PW into the payload, and encapsulate an SRH including the Segment list corresponding to the first PW or the third PW outside the received service packet, but also instructs to carry, by using an extended TLV field in the received service packet, information describing an attribute of the first PW or the third PW.

It should be noted that, for configuration on the egress PE device, refer to the following related descriptions of S105.

It should be noted that, before the method 100 is performed, each device in the SRv6 network may advertise a SID of the device in the SRv6 network by using the IGP or BGP-LS, so that each device can process a service packet based on a Segment list in the service packet.

Second, the ingress PE device obtains the SR policy to process the service packet in the SRv6 network. In this way, preparation is made for the ingress PE device to receive and process the service packet, so that PW emulation can be performed in the SRv6 network.

In an example, a controller may send an SR policy to the ingress PE device. The SR policy includes but is not limited to a Segment list corresponding to each PW, for example, may include a Segment list corresponding to the first PW. The scenario shown in FIG. 3a is used as an example. The PW 100 may receive, by using the PCEP, the Segment list 0 corresponding to the PW 100, the Segment list 1 corresponding to the PW 201, and the Segment list 2 corresponding to the PW 202 that are sent by the controller 10. The Segment list 0 and the Segment list 1 may be the same or may be different.

In another example, an SR policy may alternatively be statically configured on the ingress PE device, or the ingress PE device may determine the SR policy through calculation. The SR policy includes but is not limited to a Segment list corresponding to each PW, for example, may include a Segment list corresponding to the first PW.

During an exemplary implementation, S102 may include: The first node encapsulates a segment routing header SRH outside the first service packet, where the SRH includes the segment list Segment list corresponding to the first PW. Between S101 and S102, the method 100 may further include: The first node determines that the first service packet matches an SR policy. In this case, in an example, if the SR policy corresponds to a first instruction action, for example, S102 may include: The first node performs SRv6 encapsulation on the first service packet based on the first instruction action, to obtain the second service packet. In another example, if the SR policy does not correspond to the instruction action provided in this embodiment of this application, and a first SID of the first node corresponds to a second instruction action, after S101 and S102, the method may further include: The first node processes the first service packet based on the SR policy, to obtain a third service packet; and the first node determines that a destination address of the third service packet is the first SID of the first node. In this way, for example, S102 may include: The first node processes the third service packet based on the second instruction action, to obtain the second service packet. In another example, the second PW is established between the third node and the first node. In this case, before S101, the method 100 may further include: The first node receives a fourth service packet from the third node through the second PW; and the first node determines that a destination address of the fourth service packet is a second SID of the first node, where the second SID corresponds to a third instruction action. In this case, for example, S101 may include: The first node performs SRv6 decapsulation on the fourth service packet based on the third instruction action, to obtain the first service packet. In this case, for example, S102 may include: The first node performs SRv6 encapsulation on the first service packet based on a fourth instruction action, to obtain the second service packet, where the second SID may correspond to the fourth instruction action.

The PW information describes a corresponding PW, and may include but not limited to: Flags, PW ID, and Sequence Number. The Flags may include a plurality of flag bits, and indicates a problem such as an alarm of a service packet, and also indicates a processing operation on a service packet when a problem occurs (for example, resetting all bits when an alarm occurs in the service packet); and the Sequence Number indicates a sequence of data frames in the service packet, to implement service restoration on the data frame according to the sequence indicated by the Sequence Number. Optionally, the information may further include Length, where the Length indicates a length of the received service packet. For example, the information about the first PW may include: Flags, PW 100, Sequence Number, and a length of the first service packet. In a TLV field that carries the PW information, a value of a Type field indicates that a Value field in the TLV field carries the PW information; a Length field in the TLV field is used as an optional field, and a value of the Length field indicates a length of the PW information carried in the Value field; and the Value field in the TLV field carries the PW information, and for example, may include a plurality of Flags fields, a PW ID field, a Sequence Number field, and a Length field.

S103: The first node sends the second service packet to the second node through the first PW.

S104: The second node receives the second service packet from the first node through the first PW.

During an exemplary implementation, after S102, the first node sends the second service packet to the second node along the first PW until the second service packet arrives at the second node. In an example, each device on the first PW may process the second service packet based on the SID indicated by the SL in the SRH of the second service packet. For example, an intermediate device of the first PW forwards the second service packet based on an indication of a Function in the SID indicated by the SL.

S105: The second node performs SRv6 decapsulation on the second service packet to obtain the first service packet.

An egress PE device of the PW defines a SID corresponding to the PW and the egress PE device, and the SID corresponds to an instruction action for processing a service packet to which the PW belongs. In an example, a corresponding SID may be configured for each PW on the egress PE device, and a Function in the SID carries an instruction action for processing a service packet to which the PW belongs. For example, the first node may respectively configure a SID d and a SID e for the first PW and the third PW on the first node, where a Function in the SID a corresponding to the first PW carries an instruction action d for processing a service packet (for example, the second service packet) to which the first PW belongs, and a Function in the SID e corresponding to the third PW carries an instruction action e for processing a service packet (for example, a sixth service packet) to which the third PW belongs.

During an exemplary implementation, for example, S105 may include: The second node removes the SRH of the second service packet, where the SRH includes the Segment list corresponding to the first PW, so that the second node may obtain the first service packet in the payload of the second service packet. In an example, the SRH of the second service packet includes a SID of the second node, the SID of the second node corresponds to a first instruction action. In this case, for example, S102 may include: The second node performs SRv6 decapsulation on the second service packet based on the first instruction action, to obtain the first service packet.

For example, the instruction action corresponding to the SID of the second node may instruct to remove an IPv6 header and the SRH of the second service packet, to obtain the first service packet in the payload. The instruction action corresponding to the SID of the second node may further instruct to obtain the information about the first PW from an extended TLV field of the second service packet. In one case, the information about the first PW may be carried in a TLV field in an IPv6 extension header (for example, an IPv6 HBH or an IPv6 DOH) in the second service packet. In this case, the second node may obtain the information about the first PW from a TLV field in an IPv6 extension header of the second service packet, and a value of a Next Header field in the IPv6 extension header indicates a type of the payload (namely, the first service packet) of the second service packet, that is, a service type of the first PW emulation. In another case, the information about the first PW may alternatively be carried in an SRH TLV field in the second service packet. In this case, the second node may obtain the information about the first PW from an SRH TLV field of the second service packet, and a value of a Next Header field of the SRH indicates the type of the payload of the second service packet.

In another example, the egress PE device may configure a same SID for each PW whose egress PE device is the PE device, and a Function in the SID carries an instruction for processing a service packet to which the PW whose egress PE device is the PE device belongs. For example, the egress PE device may configure a corresponding SID f for the first PW and the third PW whose egress PE devices are both the PE device, and a Function in the SID f carry common indication content of the instruction action d and the instruction action e, that is, may instruct to perform SRv6 decapsulation on the received second service packet to obtain the first service packet.

In some possible implementations, to ensure reliability of PW emulation, before the egress PE device of the first PW decapsulates the received second service packet, the egress PE device may further verify the first PW. For example, the second node obtains an identifier of the first PW from the received second service packet, and searches a control plane to learn whether the egress PE device is configured with the first PW. If the egress PE device is configured with the first PW, the verification succeeds, and S105 is performed, to be specific, SRv6 decapsulation is performed on the received second service packet; otherwise, if the egress PE device is not configured with the first PW, the verification fails, and the second service packet is discarded.

Corresponding to the scenario shown in FIG. 3a, the first PW is the PW 100, the first node is the PE device 1, the second node is the PE device 2, the first service packet is the service packet 1, and the second service packet is the service packet 2. In this case, for S105, refer to related descriptions of S14. Alternatively, the first PW is the PW 201, the first node is the PE device 1, the second node is the PE device 2, the first service packet is the service packet 3, and the second service packet is the service packet 4'. In this case, for S105, refer to related descriptions of S25.

Optionally, after S105, the method 100 may further include S106.

S106: The second node restores, based on the information about the first PW, a service corresponding to the first service packet, to obtain a ninth service packet.

In an exemplary implementation, after obtaining the first service packet and the information about the first PW based on S105, the second node may perform service restoration based on the information about the first PW.

For example, the second node may restore the first service packet to a corresponding service queue based on the first PW indicated by the PW ID in the information about the first PW; or may perform corresponding processing on the first service packet based on a problem such as an alarm of the first service packet indicated by the Flags in the information about the first PW; or may sort data frames based on a sequence of data frames in the first service packet indicated by the Sequence Number in the information about the first PW. In addition, the second node may further verify, based on a length of the first service packet indicated by the Length in the information about the first PW, whether the first service packet obtained from the payload of the second service packet is accurate. In this way, after receiving the second service packet, the second PE device performs S105 and S106 to restore the service corresponding to the first PW.

In some possible implementations, when restoring the service corresponding to the first PW, the PE device may further send the restored service data to a corresponding service module or interface (for example, a TDM service module or interface) on the egress PE device, so that the corresponding service module or interface on the egress PE device continues to process the restored service data.

In an example, if the second node is connected to a destination host of the ninth service packet, but is not connected to another PW segment, after S106, the second node may send the ninth service packet to the destination host. For example, corresponding to the scenario shown in FIG. 3a, the first PW is the PW 100, and the second node is the PE device 2. In this case, after S106, the PE device 2 may send the ninth service packet (to be specific, service data obtained by the PE device 2 by restoring the service packet 1) to the destination host by using the CE device 2.

In another example, if the second node is connected to another PW segment, namely, a fifth PW, that is, the second node is the egress PE device of the first PW and an ingress PE device of the fifth PW, where the fifth PW is a PW between the second node and a fifth node, the second node may configure different instruction actions for a SID corresponding to both the first PW and the fifth PW, for example, configure a correspondence between the SID and a fifth instruction action and a correspondence between the SID and a sixth instruction action. In this case, when the second node receives the second service packet from the first node through the first PW, S105 may include: The second node performs SRv6 decapsulation on the second service packet based on the fifth instruction action, to obtain the first service packet. S106 may include: The second node performs service restoration based on the first service packet and the information about the first PW, to obtain the ninth service packet. In this case, the method 100 may further include: The second node performs SRv6 encapsulation on the ninth service packet based on the sixth instruction action, to obtain a tenth service packet, where the tenth service packet includes the ninth service packet and information about the fifth PW; and then, the second node may send the tenth service packet to the fifth node through the fifth PW. Corresponding to the scenario shown in FIG. 3*b*, the first PW is the PW 101, the fifth PW is the PW 100, the first node is the PE device 4, the second node is the PE device 1, the fifth node is the PE device 2, the first service packet is the service packet 5, the second service packet is the service packet 6, the ninth service packet is the service packet 5, and the tenth service packet is the service packet 6'. In this case, for S105, refer to related descriptions of S34, and for S106, refer to the related descriptions of S35.

It can be learned that, in the method 100, a service packet processing manner corresponding to the PW is defined on PE devices at both ends of the PW, so that the PE devices at both ends can implement functions such as encapsulating a PW service, carrying PW description information, and decapsulating the PW service, so that fast and convenient processing of a service packet of a PW emulation service in the SRv6 network on the PE devices at both ends of the PW is implemented without multi-protocol nesting, and efficiency of processing the service packet by the PE devices at both ends of the PW is improved. In addition, a problem that the current IP+UDP encapsulation manner cannot implement PW emulation in a network with an intermediate box device is resolved. In addition, the method 100 only requires that the PE devices at both ends of the PW have interface boards for processing IP packets, and does not need to have service boards for processing other protocols, thereby lowering requirements on hardware performance, resources, and the like of the PE devices at both ends of the PW, and improving an application scope of the PW emulation in the SRv6 network.

Figure 9:
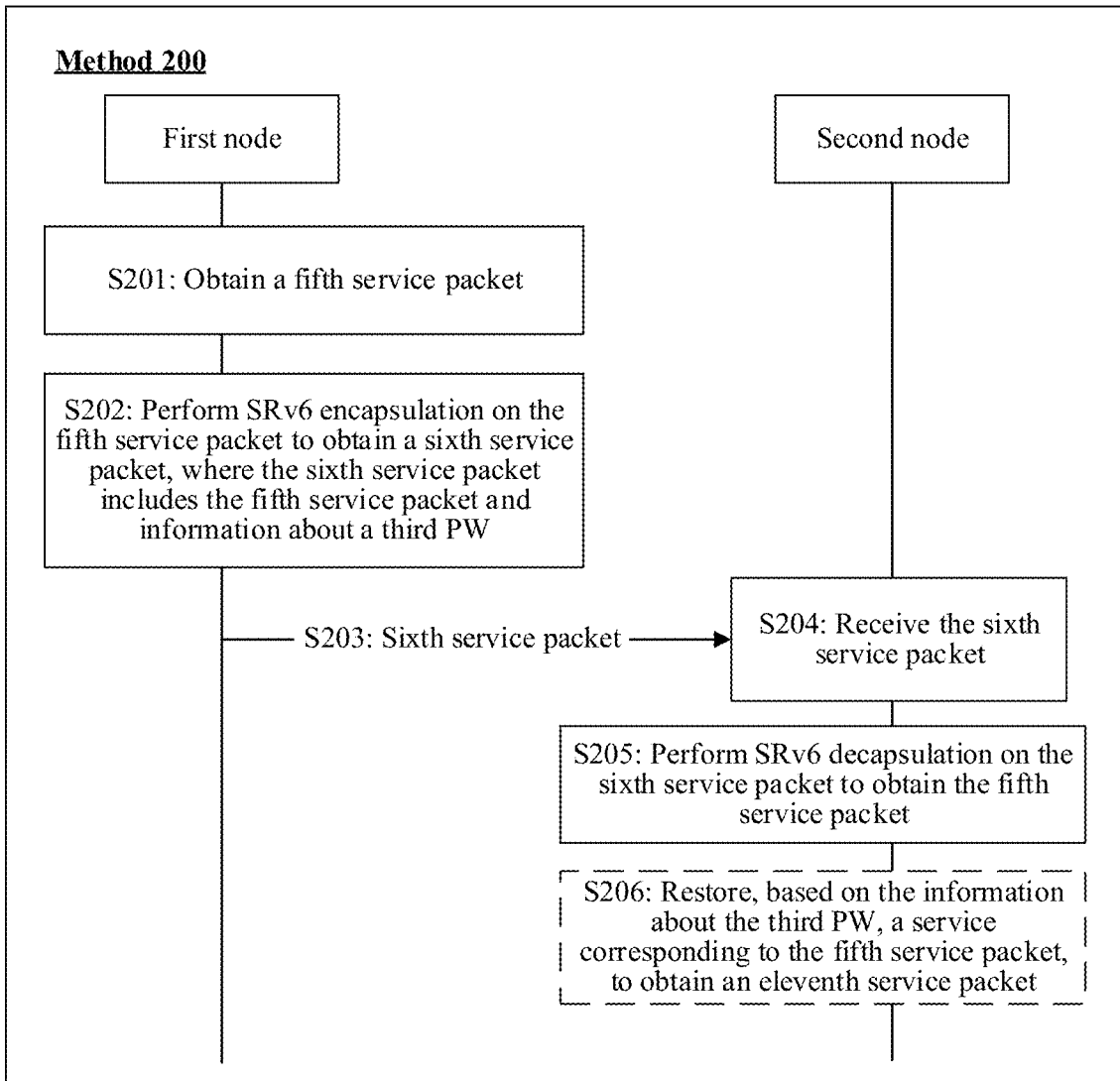
FIG. 9 is a schematic flowchart of another packet transmission method 200 according to an embodiment of this application.

FIG. 9 is a schematic flowchart of a packet transmission method 200 according to an embodiment of this application. The method 200 is applicable to PW emulation of a service packet in an SRv6 network. A difference from the method 100 lies in that: the method 200 describes an emulation process of another PW (namely, a third PW) between a first node and a second node. For example, the first node may be the PE device 1 in FIG. 3*a* or FIG. 3*b*, the second node may be the PE device 2 in FIG. 3*a* or FIG. 3*b*, the first PW in the method 100 is the PW 100 in FIG. 3*a* or FIG. 3*b*, and the second PW in the method 200 is the PW 201 in FIG. 3*a* or FIG. 3*b*. Refer to FIG. 9. For example, the method 200 may include S201 to S205.

S201: The first node obtains a fifth service packet.

S202: The first node performs SRv6 encapsulation on the fifth service packet to obtain a sixth service packet, where the sixth service packet includes the fifth service packet and information about a third PW.

A Segment list corresponding to the third PW may be the same as or may be different from a Segment list corresponding to the first PW, depending on whether the first node and the second node configure a unique corresponding SID for each different PW. If the first node and the second node configure a unique corresponding SID for each different PW, the Segment list corresponding to the third PW is different from the Segment list corresponding to the first PW; if the first node configures a same SID for the first PW and the third PW with a same path, and the second node configures a same SID for the first PW and the third PW with a same path, the Segment list corresponding to the third PW is the same as the Segment list corresponding to the first PW.

S203: The first node sends the sixth service packet to the second node through the third PW.

S204: The second node receives the sixth service packet from first node through the third PW.

S205: The second node performs SRv6 decapsulation on the sixth service packet to obtain the fifth service packet.

Optionally, the method 200 may further include S206.

S206: The second node restores based on the information about the third PW, a service corresponding to the sixth service packet, to obtain an eleventh service packet.

It should be noted that, for exemplary implementations and technical effects of S201 to S206, refer to related descriptions of S101 to S106 in the foregoing method 100.

Figure 10:
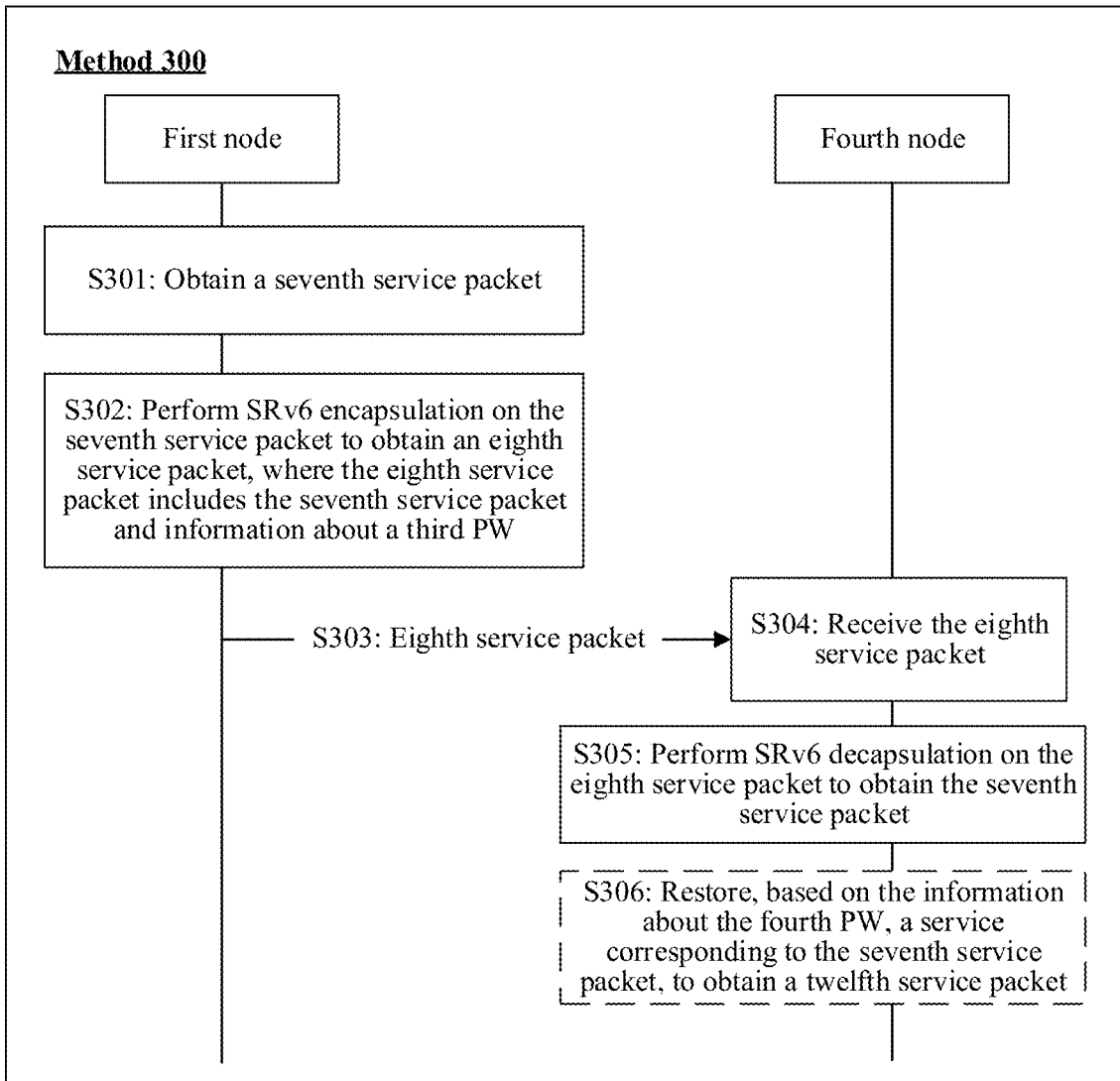
FIG. 10 is a schematic flowchart of still another packet transmission method 300 according to an embodiment of this application.

FIG. 10 is a schematic flowchart of a packet transmission method 300 according to an embodiment of this application. The method 300 is applicable to PW emulation of a service packet in an SRv6 network. A difference from the method 100 lies in that: the method 300 describes an emulation process of another PW (namely, a fourth PW) between a first node and a fourth node. For example, the first node may be the PE device 1 in FIG. 3*a* or FIG. 3*b*, the fourth node may be the PE device 3 in FIG. 3*a* or FIG. 3*b*, the first PW in the method 100 is the PW 100 in FIG. 3*a* or FIG. 3*b*, and the fourth PW in the method 300 is the PW 202 in FIG. 3*a* or FIG. 3*b*. Refer to FIG. 10. For example, the method 300 may include S301 to S305.

S301: The first node obtains a seventh service packet.

S302: The first node performs SRv6 encapsulation on the seventh service packet to obtain an eighth service packet, where the eighth service packet includes the seventh service packet and information about a fourth PW.

S303: The first node sends the eighth service packet to the fourth node through the fourth PW.

S304: The fourth node receives the eighth service packet from first node through the fourth PW.

S305: The fourth node performs SRv6 decapsulation on the eighth service packet to obtain the seventh service packet.

Optionally, the method 300 may further include S306.

S306: The fourth node restores, based on the information about the fourth PW, a service corresponding to the seventh service packet, to obtain a twelfth service packet.

It should be noted that, for exemplary implementations and technical effects of S301 to S306, refer to related descriptions of S101 to S106 in the foregoing method 100.

Figure 11:
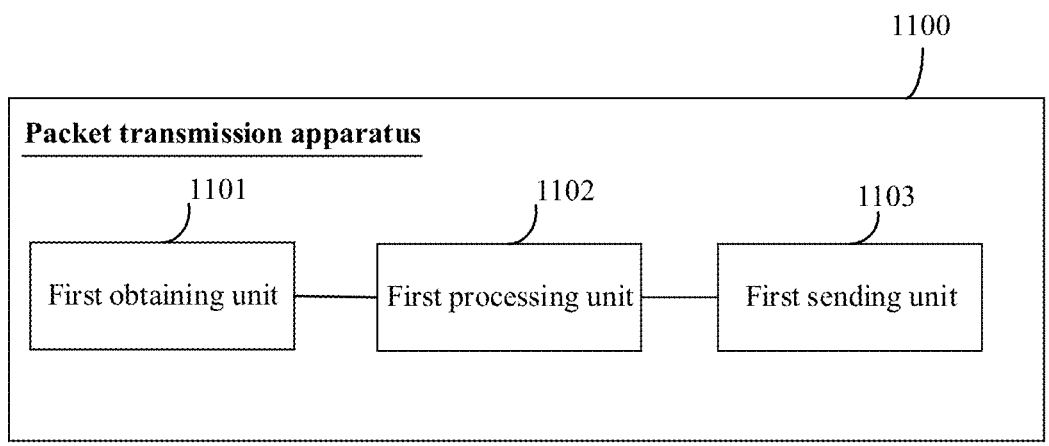
FIG. 11 is a schematic diagram of a structure of a packet transmission apparatus 1100 according to an embodiment of this application.

In addition, an embodiment of this application further provides a packet transmission apparatus 1100, as shown in FIG. 11. FIG. 11 is a schematic diagram of a structure of the packet transmission apparatus 1100 according to this embodiment of this application. The packet transmission apparatus 1100 is applied to a first node, and a first PW is established between the first node and a second node. The apparatus 1100 may include a first obtaining unit 1101, a first processing unit 1102, and a first sending unit 1103. The apparatus 1100 may be configured to perform the method 100, the method 200, or the method 300 in the foregoing embodiments.

The first obtaining unit 1101 is configured to obtain a first service packet.

The first processing unit 1102 is configured to perform SRv6 encapsulation on the first service packet to obtain a second service packet, where the second service packet includes the first service packet and information about the first PW.

The first sending unit 1103 is configured to send the second service packet to the second node through the first PW.

For an exemplary implementation and achieved effects of the operation performed by the first obtaining unit 1101, refer to related descriptions of S101 in the method 100. For an exemplary implementation and achieved effects of the operation performed by the first processing unit 1102, refer to related descriptions of S102 in the method 100. For an exemplary implementation and achieved effects of the operation performed by the first sending unit 1103, refer to related descriptions of S103 in the method 100.

In an implementation, the first processing unit 1101 is configured to encapsulate a segment routing header SRH outside the first service packet, where the SRH includes a segment list Segment list corresponding to the first PW.

In an implementation, the apparatus 1100 may further include a first determining unit. The first determining unit is configured to determine that the first service packet matches a segment routing policy SR policy.

In an example, the SR policy corresponds to a first instruction action. In this case, the first processing unit 1102 is configured to: perform SRv6 encapsulation on the first service packet based on the first instruction action, to obtain the second service packet.

In another example, the apparatus 1100 may further include a second processing unit and a second determining unit. The second processing unit is configured to: process the first service packet based on the SR policy, to obtain a third service packet; and the second determining unit is configured to determine that a destination address of the third service packet is a first SID of the first node, where the first SID corresponds to a second instruction action. In this case, the first processing unit 1102 is configured to: process the third service packet based on the second instruction action, to obtain the second service packet.

In an implementation, a second PW is established between a third node and the first node, and the apparatus 1100 may further include a receiving unit and a third determining unit. The receiving unit is configured to receive a fourth service packet from the third node through the second PW; and the third determining unit is configured to determine that a destination address of the fourth service packet is a second SID of the first node, where the second SID corresponds to a third instruction action. In this case, the first obtaining unit 1101 is configured to: perform SRv6 decapsulation on the fourth service packet based on the third instruction action, to obtain the first service packet. The second SID corresponds to a fourth instruction action, and the first processing unit 1102 is configured to: perform SRv6 encapsulation on the first service packet based on the fourth instruction action, to obtain the second service packet.

In an implementation, the apparatus 1100 may further include a second obtaining unit, a third processing unit, and a second sending unit. The second obtaining unit is configured to obtain a fifth service packet; the third processing unit is configured to perform SRv6 encapsulation on the fifth service packet to obtain a sixth service packet, where the sixth service packet includes the fifth service packet and information about the third PW; and the second sending unit is configured to send the sixth service packet to the second node through the third PW. For an exemplary implementation and achieved effects of the operation performed by the second obtaining unit, refer to related descriptions of S201 in the method 200. For an exemplary implementation and achieved effects of the operation performed by the third processing unit, refer to related descriptions of S202 in the method 200. For an exemplary implementation and achieved effects of the operation performed by the second sending unit, refer to related descriptions of S203 in the method 200.

In an implementation, an IPv6 DOH of the second service packet carries the information about the first PW; or an SRH of the second service packet carries the information about the first PW.

In an implementation, the information about the first PW may include: a plurality of flags Flags, an identifier of the first PW, and a sequence number Sequence Number.

In an implementation, the first service packet is a packet corresponding to a non-Ethernet service. The non-Ethernet service includes any one of the following services: a frame relay service, a time division multiplexing TDM service, or an asynchronous transfer mode ATM service. The TDM service may include but is not limited to: an E1 service, a T1 service, an E3 service, a T3 service, a SONET service, or an SDH service.

Figure 12:
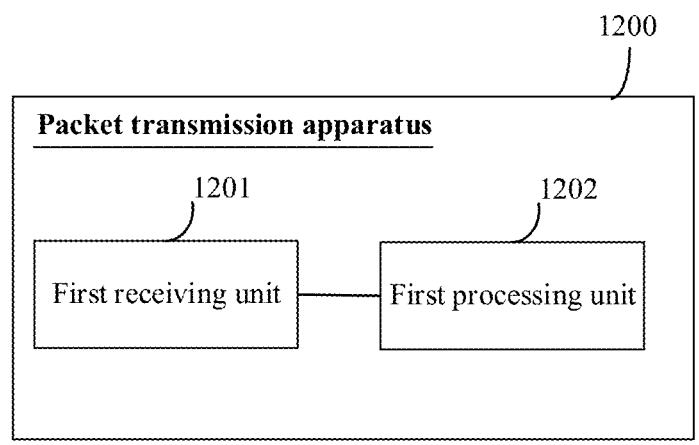
FIG. 12 is a schematic diagram of a structure of a packet transmission apparatus 1200 according to an embodiment of this application.

In addition, an embodiment of this application further provides a packet transmission apparatus 1200, as shown in FIG. 12. FIG. 12 is a schematic diagram of a structure of the packet transmission apparatus 1200 according to this embodiment of this application. The packet transmission apparatus 1200 is applied to a second node, a first PW is established between a first node and the second node, and the apparatus 1200 may include a first receiving unit 1201 and a first processing unit 1202. The apparatus 1200 may be configured to perform the method 100, the method 200, or the method 300 in the foregoing embodiments.

The first receiving unit 1201 is configured to receive a second service packet from the first node through the first PW, where the second service packet includes a first service packet and information about the first PW.

The first processing unit 1202 is configured to perform segment routing over internet protocol version 6 SRv6 decapsulation on the second service packet to obtain the first service packet.

For an exemplary implementation and achieved effects of the operation performed by the first receiving unit 1201, refer to related descriptions of S104 in the method 100. For an exemplary implementation and achieved effects of the operation performed by the first processing unit 1202, refer to related descriptions of S105 in the method 100.

In an implementation, the first processing unit 1201 is configured to remove a segment routing header SRH of the second service packet, where the SRH includes a segment list Segment list corresponding to the first PW.

In an implementation, the SRH of the second service packet includes a SID of the second node, the SID of the second node corresponds to a first instruction action, and the first processing unit 1201 is configured to: perform SRv6 decapsulation on the second service packet based on the first instruction action, to obtain the first service packet and the information about the first PW.

In an implementation, the apparatus 1200 may further include a restoring unit. The restoring unit is configured to: restore a service corresponding to the first service packet based on the information about the first PW, to obtain a third service packet. For an exemplary implementation and achieved effects of the operation performed by the restoring unit, refer to related descriptions of S106 in the method 100.

In an example, the apparatus 1200 may further include a first sending unit. The first sending unit is configured to send the third service packet to a destination host.

In another example, a second PW is established between the second node and a third node, and the apparatus 1200 may further include a second processing unit and a second sending unit. The second processing unit is configured to perform SRv6 encapsulation on the third service packet to obtain a fourth service packet, where the fourth service packet includes the third service packet and information about the second PW; and the second sending unit is configured to send the fourth service packet to the third node through the second PW. The SRH of the second service packet may include the SID of the second node, the SID of the second node further corresponds to a second instruction action, and the second processing unit is configured to: perform SRv6 encapsulation on the third service packet based on the second instruction action, to obtain the fourth service packet.

In an implementation, an IPv6 DOH of the second service packet carries the information about the first PW; or an SRH of the second service packet carries the information about the first PW.

In an implementation, the information about the first PW may include: a plurality of flags Flags, an identifier of the first PW, and a sequence number Sequence Number.

In an implementation, the first service packet is a packet corresponding to a non-Ethernet service. The non-Ethernet service includes any one of the following services: a frame relay service, a time division multiplexing TDM service, or an asynchronous transfer mode ATM service. The TDM service may include but is not limited to: an E1 service, a T1 service, an E3 service, a T3 service, a SONET service, or an SDH service.

It should be noted that, for exemplary implementations and achieved effects of the packet transmission apparatus 1100 and the packet transmission apparatus 1200 provided in embodiments of this application, refer to related descriptions in the method 100, the method 200, or the method 300. Details are not described herein again.

Figure 13:
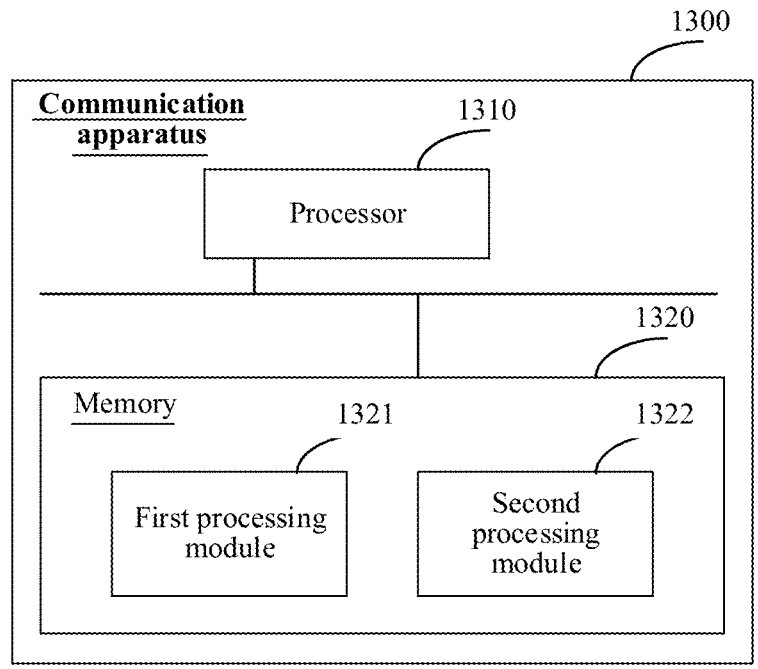
FIG. 13 is a schematic diagram of a structure of a communication apparatus 1300 according to an embodiment of this application.

In addition, an embodiment of this application further provides a communication apparatus 1300. Refer to FIG. 13. FIG. 13 is a schematic diagram of a structure of the communication apparatus 1300 according to this embodiment of this application. The communication apparatus 1300 may be configured to perform the method 100, the method 200, or the method 300 in the foregoing embodiments.

As shown in FIG. 13, the communication apparatus 1300 may include a processor 1310 and a memory 1320 coupled to the processor 1310. The processor 1310 may be a central processing unit (CPU), a network processor (NP), or a combination of the CPU and the NP. Alternatively, the processor may be an application-specific integrated circuit (ASIC), a programmable logic device (PLD), or a combination thereof. The PLD may be a complex programmable logic device (CPLD), a field programmable gate array (FPGA), a generic array logic (GAL), or any combination thereof. The processor 1310 may be one processor, or may include a plurality of processors. The memory 1320 may include a volatile memory, for example, a random-access memory (RAM). The memory may further include a non-volatile memory, for example, a read-only memory (ROM), a flash memory, a hard disk drive (HDD), or a solid-state drive (SSD). The memory 1320 may further include a combination of the foregoing memories. The memory 1320 may be one memory, or may include a plurality of memories. In an implementation, the memory 1320 stores computer-readable instructions, and the computer-readable instructions include a plurality of software modules, for example, a first processing module 1321 and a second processing module 1322. In addition, the computer-readable instructions may further include at least one of a third processing module, a fourth processing module, and a fifth processing module, which may respectively correspond to one function module of the first processing unit 1102 in the packet transmission apparatus 1100; or may respectively correspond to one function module in the first processing unit 1202 in the packet transmission apparatus 1200. After executing each software module, the processor 1310 may perform a corresponding operation according to an indication of each software module. In this embodiment, an operation performed by a software module is actually the operation performed by the processor 1310 according to the indication of the software module. For example, the "performing SRv6 encapsulation on the first service packet to obtain a second service packet" performed by the first processing module 1321 may actually be the "performing SRv6 encapsulation on the first service packet to obtain a second service packet" performed by the processor 1310 according to an instruction of the first processing module 1321. In this case, the first processing module 1321 may correspond to the first processing unit 1102 in the packet transmission apparatus 1100.

In an example, the communication apparatus 1300 may perform the method 100 in the foregoing embodiment. When the communication apparatus 1300 is configured to perform the method 100 in the foregoing embodiment, the processor 1310 is configured to perform all processing-related operations in the method 100. For example, the processor 1310 is configured to perform SRv6 encapsulation on the first service packet to obtain the second service packet. For another example, the processor 1310 is further configured to perform SRv6 decapsulation on the second service packet to obtain the first service packet.

In an example, the communication apparatus 1300 may perform the method 200 in the foregoing embodiment. When the communication apparatus 1300 is configured to perform the method 200 in the foregoing embodiment, the processor 1310 is configured to perform all processing-related operations in the method 200. For example, the processor 1310 is configured to perform SRv6 encapsulation on the fifth service packet to obtain the sixth service packet. For another example, the processor 1310 is further configured to perform SRv6 decapsulation on the sixth service packet to obtain the fifth service packet.

Figure 14:
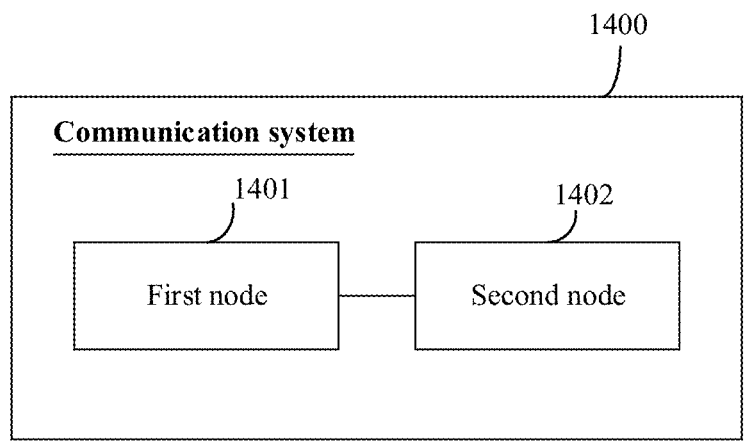
FIG. 14 is a schematic diagram of a structure of a communication system 1400 according to an embodiment of this application.

In addition, an embodiment of this application further provides a communication system 1400, as shown in FIG. 14. FIG. 14 is a schematic diagram of a structure of the communication system 1400 according to this embodiment of this application. The communication system 1400 may include a first node 1401 and a second node 1402.

The first node 1401 may be, for example, the PE device 1 in FIG. 3*a* or FIG. 3*b*, or may be the first node in FIG. 8, FIG. 9, or FIG. 10, and is configured to perform operations implemented by the first node in the method 100, the method 200, and the method 300.

The second node 1402 may be, for example, the PE device 2 or the PE device 3 in FIG. 3*a* or FIG. 3*b*, or may be the second node in FIG. 8, FIG. 9, or FIG. 10, and is configured to perform operations implemented by the second node in the method 100, the method 200, and the method 300.

It should be noted that, for an exemplary implementation and achieved effects of the communication system 1400, refer to related descriptions of the foregoing method 100, method 200, and method 300.

This application further provides a computer-readable storage medium. The computer-readable storage medium stores instructions, and when the instructions are run on a computer, the computer is enabled to perform any one or more operations in the method (for example, the method 100, the method 200, or the method 300) according to any one of the foregoing embodiments.

This application further provides a computer program product including a computer program. When the computer program is run on a computer, the computer is enabled to perform any one or more operations in the method (for example, the method 100, the method 200, or the method 300) according to any one of the foregoing embodiments.

In the specification, claims, and accompanying drawings of this application, the terms "first", "second", "third", "fourth", and the like (if existent) are intended to distinguish between similar objects but do not necessarily indicate a specific order or sequence. It should be understood that data termed in such a way is interchangeable in proper circumstances, so that embodiments described herein can be implemented in other orders than the order illustrated or described herein. Moreover, the terms "include", "contain", and any other variants mean to cover a non-exclusive inclusion. For example, a process, method, system, product, or device that includes a series of steps or units is not necessarily limited to the expressly listed steps or units, but may include other steps or units not expressly listed or inherent to such a process, method, product, or device.

It may be understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical service division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the embodiments.

In addition, service units in embodiments of this application may be integrated into one processing unit, or each of the units may exist alone physically, or two or more units may be integrated into one unit. The integrated unit may be implemented in a form of hardware, or may be implemented in a form of a software service unit.

When the integrated unit is implemented in the form of a software service unit and sold or used as an independent product, the integrated unit may be stored in a computer-readable storage medium. Based on such an understanding, embodiments of this application essentially, or a part contributing to the conventional technology, or all or some of the embodiments may be implemented in a form of a software product. The computer software product is stored in a storage medium and includes several instructions for instructing a computer device (which may be a personal computer, a server, a network device, or the like) to perform all or some of the steps of the method in embodiments of this application. The storage medium includes any medium that can store program code, such as a USB flash drive, a removable hard disk, a read-only memory (ROM), a random access memory (RAM), a magnetic disk, or an optical disc.

Persons skilled in the art should be aware that in the foregoing one or more examples, the services described in this application may be implemented by hardware, software, firmware, or any combination thereof. When the services are implemented by using the software, the services may be stored in a computer-readable medium or transmitted as one or more instructions or code in the computer-readable medium. The computer-readable medium includes a computer storage medium and a communication medium, and the communication medium includes any medium that enables a computer program to be transmitted from one place to another. The storage medium may be any available medium accessible to a general-purpose or special-purpose computer.

In the foregoing exemplary implementations, the benefits of this application are further described in detail. It should be understood that the foregoing descriptions are merely exemplary implementations of this application.

In conclusion, the foregoing embodiments are merely intended for describing this application, but not for limiting this application. Although this application is described in detail with reference to the foregoing embodiments, persons of ordinary skill in the art should understand that they may still make modifications to the foregoing embodiments or make equivalent replacements to some features thereof, without departing from the scope of the embodiments of this application.

What is claimed is:

1. A packet transmission method, executed by a first node, wherein a first pseudo wire (PW) is established between the first node and a second node, and the method comprises:
obtaining a first service packet that is a packet corresponding to a non-Ethernet Layer 2 service;
performing segment routing over internet protocol version 6 (SRv6) encapsulation on the first service packet to obtain a second service packet, wherein the second service packet comprises the first service packet and information about the first PW; and
sending the second service packet to the second node through the first PW,
wherein the non-Ethernet service comprises any one of the following services: a frame relay service, a time division multiplexing (TDM) service, or an asynchronous transfer mode (ATM) service.

2. The method according to claim 1, wherein the performing SRv6 encapsulation on the first service packet comprises:
encapsulating a segment routing header (SRH) outside the first service packet, wherein the SRH comprises a segment list corresponding to the first PW.

3. The method according to claim 1, wherein the method further comprises:
determining that the first service packet matches a segment routing (SR) policy.

4. The method according to claim 3, wherein the SR policy corresponds to a first instruction action, and the performing SRv6 encapsulation on the first service packet to obtain the second service packet comprises:
performing SRv6 encapsulation on the first service packet based on the first instruction action, to obtain the second service packet.

5. The method according to claim 3, wherein the method further comprises:
  processing the first service packet based on the SR policy, to obtain a third service packet; and
  determining that a destination address of the third service packet is a first segment identifier (SID) of the first node, wherein the first SID corresponds to a second instruction action; and
  the performing SRv6 encapsulation on the first service packet to obtain the second service packet comprises:
  processing the third service packet based on the second instruction action, to obtain the second service packet.

6. The method according to claim 1, wherein a second PW is established between a third node and the first node, and the method further comprises:
  receiving a fourth service packet from the third node through the second PW; and
  determining that a destination address of the fourth service packet is a second segment identifier (SID) of the first node, wherein the second SID corresponds to a third instruction action; and
  the obtaining the first service packet comprises:
  performing SRv6 decapsulation on the fourth service packet based on the third instruction action, to obtain the first service packet.

7. The method according to claim 6, wherein the second SID corresponds to a fourth instruction action, and the performing SRv6 encapsulation on the first service packet to obtain the second service packet comprises:
  performing SRv6 encapsulation on the first service packet based on the fourth instruction action, to obtain the second service packet.

8. The method according to claim 1, wherein a third PW is established between the first node and the second node, and the method further comprises:
  obtaining a fifth service packet;
  performing SRv6 encapsulation on the fifth service packet to obtain a sixth service packet, wherein the sixth service packet comprises the fifth service packet and information about the third PW; and
  sending the sixth service packet to the second node through the third PW.

9. The method according to claim 1, wherein an internet protocol version 6 (IPv6) destination option header (DOH) of the second service packet carries the information about the first PW.

10. The method according to claim 1, wherein a segment routing header (SRH) of the second service packet carries the information about the first PW.

11. The method according to claim 1, wherein the information about the first PW comprises an identifier of the first PW, a plurality of flags, and a sequence number.

12. A packet transmission method, executed by a second node, wherein a first pseudo wire (PW) is established between a first node and the second node, and the method comprises:
  receiving, from the first node through the first PW, a second service packet that comprises a first service packet and information about the first PW, wherein the first service packet is a packet corresponding to a non-Ethernet Layer 2 service; and
  performing segment routing over internet protocol version 6 (SRv6) decapsulation on the second service packet to obtain the first service packet,
  wherein the non-Ethernet service comprises any one of the following services: a frame relay service, a time division multiplexing (TDM) service, or an asynchronous transfer mode (ATM) service.

13. The method according to claim 12, wherein the performing SRv6 decapsulation on the second service packet comprises:
  removing a segment routing header (SRH) of the second service packet, wherein the SRH comprises a segment list corresponding to the first PW.

14. The method according to claim 13, wherein the SRH of the second service packet comprises a segment identifier (SID) of the second node, the SID of the second node corresponds to a first instruction action, and the performing SRv6 decapsulation on the second service packet to obtain the first service packet comprises:
  performing SRv6 decapsulation on the second service packet based on the first instruction action, to obtain the first service packet.

15. The method according to claim 12, wherein the method further comprises:
  restoring a service corresponding to the first service packet based on the information about the first PW, to obtain a third service packet.

16. The method according to claim 15, wherein the method further comprises:
  sending the third service packet to a destination host.

17. The method according to claim 15, wherein a second PW is established between the second node and a third node, and the method further comprises:
  performing SRv6 encapsulation on the third service packet to obtain a fourth service packet, wherein the fourth service packet comprises the third service packet and information about the second PW; and
  sending the fourth service packet to the third node through the second PW.

18. The method according to claim 17, wherein a segment routing header (SRH) of the second service packet comprises a segment identifier SID of the second node, the SID of the second node further corresponds to a second instruction action, and the performing SRv6 encapsulation on the third service packet to obtain the fourth service packet comprises:
  performing SRv6 encapsulation on the third service packet based on the second instruction action, to obtain the fourth service packet.

19. A packet transmission apparatus, executed by a first node, wherein a first pseudo wire (PW) is established between the first node and a second node, and the apparatus comprises:
  a receiver, configured to obtain a first service packet that is a packet corresponding to a non-Ethernet Layer 2 service;
  a processor, configured to perform segment routing over internet protocol version 6 (SRv6) encapsulation on the first service packet to obtain a second service packet, wherein the second service packet comprises the first service packet and information about the first PW; and
  a transmitter, configured to send the second service packet to the second node through the first PW,
  wherein the non-Ethernet service comprises any one of the following services: a frame relay service, a time division multiplexing (TDM) service, or an asynchronous transfer mode (ATM) service.

20. The packet transmission apparatus according to claim 19, wherein the processor, performing SRv6 encapsulation on the first service packet, comprises:

encapsulating a segment routing header (SRH) outside the first service packet, wherein the SRH comprises a segment list corresponding to the first PW.

21. The packet transmission apparatus according to claim 19, wherein the processor is further configured to perform:
determining that the first service packet matches a segment routing (SR) policy.

22. The packet transmission apparatus according to claim 21, wherein the SR policy corresponds to a first instruction action, and the processor performing SRv6 encapsulation on the first service packet to obtain the second service packet comprises:
performing SRv6 encapsulation on the first service packet based on the first instruction action, to obtain the second service packet.

23. The packet transmission apparatus according to claim 21, wherein the processor is further configured to:
process the first service packet based on the SR policy, to obtain a third service packet; and
determine that a destination address of the third service packet is a first segment identifier (SID) of the first node, wherein the first SID corresponds to a second instruction action; and
the performing SRv6 encapsulation on the first service packet to obtain the second service packet comprises:
processing the third service packet based on the second instruction action, to obtain the second service packet.

24. The packet transmission apparatus according to claim 19, wherein a second PW is established between a third node and the first node, and wherein:
the receiver is configured to receive a fourth service packet from the third node through the second PW; and
the processor is configured to determine that a destination address of the fourth service packet is a second segment identifier (SID) of the first node, wherein the second SID corresponds to a third instruction action; and
the obtaining the first service packet comprises:
performing SRv6 decapsulation on the fourth service packet based on the third instruction action, to obtain the first service packet.

25. The packet transmission apparatus according to claim 24, wherein the second SID corresponds to a fourth instruction action, and wherein the performing SRv6 encapsulation on the first service packet to obtain the second service packet comprises:
performing SRv6 encapsulation on the first service packet based on the fourth instruction action, to obtain the second service packet.

26. The packet transmission apparatus according to claim 19, wherein a third PW is established between the first node and the second node, and the processor is further configured to:
obtain a fifth service packet;
perform SRv6 encapsulation on the fifth service packet to obtain a sixth service packet, wherein the sixth service packet comprises the fifth service packet and information about the third PW; and
send the sixth service packet to the second node through the third PW.

* * * * *